(12) United States Patent
Tabata et al.

(10) Patent No.: US 7,445,578 B2
(45) Date of Patent: Nov. 4, 2008

(54) CONTROL DEVICE FOR VEHICULAR DRIVE SYSTEM

(75) Inventors: Atsushi Tabata, Okazaki (JP); Yutaka Taga, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 166 days.

(21) Appl. No.: 11/322,246

(22) Filed: Jan. 3, 2006

(65) Prior Publication Data
US 2007/0155581 A1   Jul. 5, 2007

(51) Int. Cl.
*B60K 1/02* (2006.01)
(52) U.S. Cl. ......................................................... 477/3
(58) Field of Classification Search ...................... 477/3, 477/110, 107
See application file for complete search history.

(56) References Cited

U.S. PATENT DOCUMENTS

| | | | |
|---|---|---|---|
| 7,226,385 B2 * | 6/2007 | Tabata et al. .................... | 477/5 |
| 7,249,642 B2 * | 7/2007 | Tabata et al. ................ | 180/65.2 |

FOREIGN PATENT DOCUMENTS

| | | | |
|---|---|---|---|
| JP | 1-76336 | | 5/1989 |
| JP | 1-113531 | | 5/1989 |
| JP | 9-308010 | | 11/1997 |
| JP | 10-23607 | * | 1/1998 |
| JP | 11-217025 | * | 8/1999 |
| JP | 2000-295709 | * | 10/2000 |
| JP | 2001-105908 | * | 4/2001 |
| JP | 2003-130203 | * | 5/2003 |

* cited by examiner

*Primary Examiner*—Dirk Wright
(74) *Attorney, Agent, or Firm*—Oblon, Spivak, McClelland, Maier & Neustadt, P.C.

(57) ABSTRACT

A control device for a vehicular drive system including (a) a differential portion having a differential mechanism operable to distribute an output of an engine to a first electric motor and a power transmitting member, and a second electric motor disposed in a power transmitting path between the power transmitting member and a drive wheel of a vehicle, (b) a transmission portion which constitutes a part of the power transmitting path, (c) a coupling device operable to place a power transmitting path between the engine and the drive wheel, selectively in a power-transmitting state or a power-cutoff state, and (d) a shift lever operable between a drive position for the coupling device to select the power-transmitting state, and a non-drive position for the coupling device to select the power-cutoff state, the control device including an engine-speed control device for controlling engine speed $N_E$ so as not to exceed a predetermined engine speed value $N_E'$ while the shift lever is placed in the non-drive position, so that the coupling device is engaged while engine torque $T_E$ is reduced as a result of an operation of the shift lever from the non-drive position to the drive position, whereby the durability of the coupling device is improved.

20 Claims, 13 Drawing Sheets

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | SPREAD 4.76 |
| R |  |  | ○ |  |  |  | ○ | 3.209 | |
| N | ○ |  |  |  |  |  |  | | |

○ ENGAGED
◎ ENGAGED FOR STEP-VARIABLE SHIFTING, AND RELEASED FOR CONTINUOUSLY-VARIABLE SHIFTING

|  | C0 | C1 | C2 | B0 | B1 | B2 | SPEED RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | SPREAD 3.977 |
| R |  |  | ○ |  |  | ○ | 2.393 |  |
| N |  | ○ |  |  |  |  |  |  |

○ ENGAGED
◎ ENGAGED FOR STEP-VARIABLE SHIFTING, AND RELEASED FOR CONTINUOUSLY-VARIABLE SHIFTING

CONTROL DEVICE FOR VEHICULAR DRIVE SYSTEM

BACKGROUND OF THE INVENTION

1. Field of the Invention

The present invention relates to a control device for a vehicular drive system, and more particularly to a vehicular drive system which includes a differential mechanism operable to perform a differential function, and a transmission constituting a part of a power transmitting path between the differential mechanism and drive wheels, and which is improved in the durability of coupling devices provided to switch a power transmitting path between an engine and the drive wheels, between a power-cutoff state and a power-transmitting state.

2. Discussion of Related Art

There is known a vehicular drive system including a differential mechanism operable to mechanically synthesize forces and distribute a force, and an electric motor operatively connected to the differential mechanism. Examples of this type of vehicular drive system include a drive system for a hybrid vehicle as disclosed in Patent Document 1. In this hybrid vehicle drive systems, the differential mechanism is constituted by a planetary gear set, and a so-called "electric torque converter" is provided to transmit a drive force from an engine to drive wheels, according to a reaction torque of an electric motor. The vehicular drive system of the Patent Document 1 further includes a step-variable automatic transmission disposed in a power transmitting path between the planetary gear set and the drive wheels. The power transmitting path between the engine and the drive wheels is switched between a power-cutoff state and a power-transmitting state, by controlling releasing and engaging actions of clutches incorporated in the step-variable automatic transmission. The vehicle disclosed in the Patent Document 1 is provided with a manually operable shifting device operable to switch the power transmitting path between a non-drive position for establishing the power-cutoff state, and a drive position for establishing the power-transmitting state.

[Patent Document 1] JP-9-308010A
[Patent Document 2] JP-1-113531A
[Patent Document 3] JP-1-76336A When the above-described shifting device is manually operated from the non-drive position to the drive position, an output torque of the engine (hereinafter referred to as "engine torque") is transmitted to the drive wheels through the step-variable automatic transmission.

However, the manual operation from the non-drive position to the drive position has a risk of deterioration of durability of the coupling devices provided for switching of the power transmitting path between the power-cutoff state and the power-transmitting state. The risk of deterioration increases with an increase of the engine torque to be transmitted.

SUMMARY OF THE INVENTION

The present invention was made in view of the background art described above. It is therefore an object of this invention to provide a control device of a vehicular drive system including a differential mechanism operable to perform a differential function, and a transmission constituting a part of a power transmitting path between the differential mechanism and drive wheels, which control device provides an improvement in the durability of coupling devices provided to switch a power transmitting path between an engine and the drive wheels, between a power-cutoff state and a power-transmitting state.

Namely, the present invention defined in claim 1 provides a control device for a vehicular drive system including (a) a differential portion having a differential mechanism operable to distribute an output of an engine to a first electric motor and a power transmitting member, and a second electric motor disposed in a power transmitting path between the power transmitting member and a drive wheel of a vehicle, (b) a transmission portion which constitutes a part of the power transmitting path and which functions as a transmission, (c) a coupling device operable to place a power transmitting path between the engine and the drive wheels, selectively in one of a power-transmitting state and a power-cutoff state, and (d) a shifting device operable between a drive position for the coupling device to select the power-transmitting state, and a non-drive position for the coupling device to select the power-cutoff state, said control device comprising engine-speed control means for controlling a speed of the engine so as not to exceed a predetermined value while the shifting device is placed in the non-drive position.

In the above-described drive system including the differential portion having the differential mechanism having the differential function and further including the transmission portion, the coupling device is provided to place the power transmitting path selectively in one of the power-transmitting state and the power-cutoff state, and the shifting device is manually operable between the drive position for the coupling device to place the power transmitting path in the power-transmitting state, and the non-drive position for the coupling device to place the power transmitting path in the power-cutoff state. While the shifting device is placed in the non-drive position, the engine-speed control means controls the engine speed so as not to exceed the predetermined value, for thereby reducing the engine torque to be transmitted to the drive wheel through the coupling device in the process of the engaging action as a result of the manual operation of the shifting device from the non-drive position to the drive position, so that the coupling device is engaged while the engine torque is reduced, whereby the durability of the coupling device is improved.

According to the present invention defined in claim 2, the engine-speed control means controls an output of the engine, to thereby control the speed of the engine so as not to exceed the predetermined value, and the control device further comprises electric-motor control means for placing the first electric motor and the second electric motor in a non-load state while the shifting device is placed in the non-drive position. In the present arrangement, the operation of the engine-speed control means to control the engine speed so as not to exceed the predetermined value is performed by controlling the output of the engine, so that there is a reduced necessity to control the engine speed by operating the first electric motor and/or the second electric motor. Therefore, the first electric motor and the second electric motor are placed in the non-load state under the control of the electric-motor control means, so that the loss of electric energy for controlling the electric motors is reduced, and the fuel economy is improved. Further, while the first electric motor and the second electric motor are placed in the non-load state under the control of the electric-motor control means, the differential portion is placed in the electrically neutral state in which the differential portion is not able to transmit the engine torque, that is, the power transmitting path is in the power-cutoff state. Accordingly, upon the manual operation of the shifting device from the non-drive position to the drive position, the coupling device is engaged while the engine torque is not transmitted through the power transmitting path, so that the durability of the coupling device is further improved.

The present invention defined in claim 3 provides a control device for a vehicular drive system including (a) a differential portion having a differential mechanism operable to distribute an output of an engine to a first electric motor and a power transmitting member, and a second electric motor disposed in a power transmitting path between the power transmitting member and a drive wheel of a vehicle, (b) a transmission portion which constitutes a part of the power transmitting path and which functions as a transmission, (c) a coupling device operable to place a power transmitting path between the engine and the drive wheels, selectively in one of a power-transmitting state and a power-cutoff state, and (d) a shifting device operable between a drive position for the coupling device to select the power-transmitting state, and a non-drive position for the coupling device to select the power-cutoff state, said control device comprising electric-motor means for placing said first electric motor and said second electric motor in a non-load state while said shifting device is placed in said non-drive position.

In the above-described drive system including the differential portion having the differential mechanism having the differential function and further including the transmission portion, the coupling device is provided to place the power transmitting path selectively in one of the power-transmitting state and the power-cutoff state, and the shifting device is manually operable between the drive position for the coupling device to place the power transmitting path in the power-transmitting state, and the non-drive position for the coupling device to place the power transmitting path in the power-cutoff state. While the shifting device is placed in the non-drive position, the electric-motor control means places the first electric motor and the second electric motor in the non-load state, for thereby placing the differential portion in the electrically neutral state, so that the engine torque is not transmitted to the drive wheel upon the manual operation of the shifting device from the non-drive position to the drive position, that is, the engine torque is not transmitted to the coupling device in the process of the engaging action which takes place as a result of the manual operation. Therefore, the coupling device is engaged while the engine torque is not transmitted, whereby the durability of the coupling device is improved, and/or the shifting shock due to the manual operation of the shift lever 48 is reduced. Further, the fuel economy is improved since the loss of electric energy for controlling the first and second electric motors is reduced while the first and second electric motors are placed in the non-load state under the control of the electric-motor control means.

According to the present invention defined in claim 4, the transmission portion is a step-variable automatic transmission, and the coupling device is provided to shift the step-variable automatic transmission. Further, the step-variable automatic transmission is placed into a power-cutoff state by the coupling device when the shifting device is operated to said non-drive position. Accordingly, the power transmitting path can be easily placed into the power-cutoff state when the shifting device is operated to the non-drive position.

According to the present invention defined in claim 5, the differential mechanism includes a differential-state switching device operable to place the differential mechanism selectively into a differential state and a locked state, and the differential mechanism is placed into the differential state by the differential-state switching device when the shifting device is operated to the non-drive position. In this arrangement, the differential mechanism is operable between the differential state and the non-differential state. In the differential or non-locked state of the differential mechanism, the rotary elements of the differential mechanism can be freely rotatable, so that the differential portion can be placed in the electrically neutral state with the first electric motor and the second electric motor being placed in the non-load state under the control of the electric-motor control means. Where the transmission portion is a step-variable automatic transmission, a continuously variable transmission is constituted by the transmission portion and the differential mechanism placed in the differential state, while the step-variable transmission is constituted by the transmission portion and the differential mechanism placed in the locked state.

Preferably, the differential mechanism includes a first element fixed to the, a second element fixed to the first electric motor, and a third element fixed to the power distributing member, and the above-indicated differential-state switching device is operable to permit the first, second and third elements to be rotated relative to each other, for thereby placing the differential mechanism in the differential state, and to connect the first, second and third elements for rotation as a unit or to hold the second element stationary, for thereby placing the differential mechanism in the locked state. Thus, the differential mechanism can be switched between the differential and locked states.

Preferably, the differential-state switching device includes a clutch operable to connect at least two of the first, second and third elements to each other for rotation of the first, second and third elements as a unit, and/or a brake operable to fix the second element to a stationary member for holding the second element stationary. In this arrangement, the differential mechanism can be easily switched between the differential and locked states.

Preferably, the differential-state switching device is operable to release the clutch and the brake for thereby placing the differential mechanism in the differential state in which the first, second and third elements are rotatable relative to each other and in which the differential mechanism functions as an electrically controlled differential device, and to engage the clutch for thereby enabling the differential mechanism to function as a transmission having a speed ratio of 1, or engage the brake for thereby enabling the differential mechanism to function as a speed-increasing transmission having a speed ratio lower than 1. In this arrangement, the differential mechanism can be switched between the differential and locked state, and is able to function as a transmission having a single gear position with a fixed speed ratio, or a plurality of gear positions with respective fixed speed ratios.

Preferably, the differential mechanism is a planetary gear set, and the first, second and third elements are respective a carrier, a sun gear and a ring gear of the planetary gear set. In this arrangement, the axial dimension of the differential mechanism can be reduced, and the differential mechanism constituted by a single planetary gear set can be simplified in construction.

Preferably, the planetary gear set is of a single-pinion type. In this case, the axial dimension of the differential mechanism can be reduced, and the differential mechanism constituted by a single planetary gear set of the single-pinion type can be simplified in construction.

Preferably, the vehicular drive system has an overall speed ratio which is determined by a speed ratio of the transmission portion and a speed ratio of the differential portion. In this case, the vehicle drive force can be obtained over a wide range of speed ratio, by utilizing the speed ratio range of the transmission portion.

BRIEF DESCRIPTION OF THE DRAWINGS

The above and other objects, features, advantages and industrial significance of the present invention will be better understood by reading the following detailed description of preferred embodiments of this invention, when taken in connection with the accompanying drawings, in which.

DETAILED DESCRIPTION OF THE PREFERRED EMBODIMENTS

Embodiment 1

Figures 1, 2:
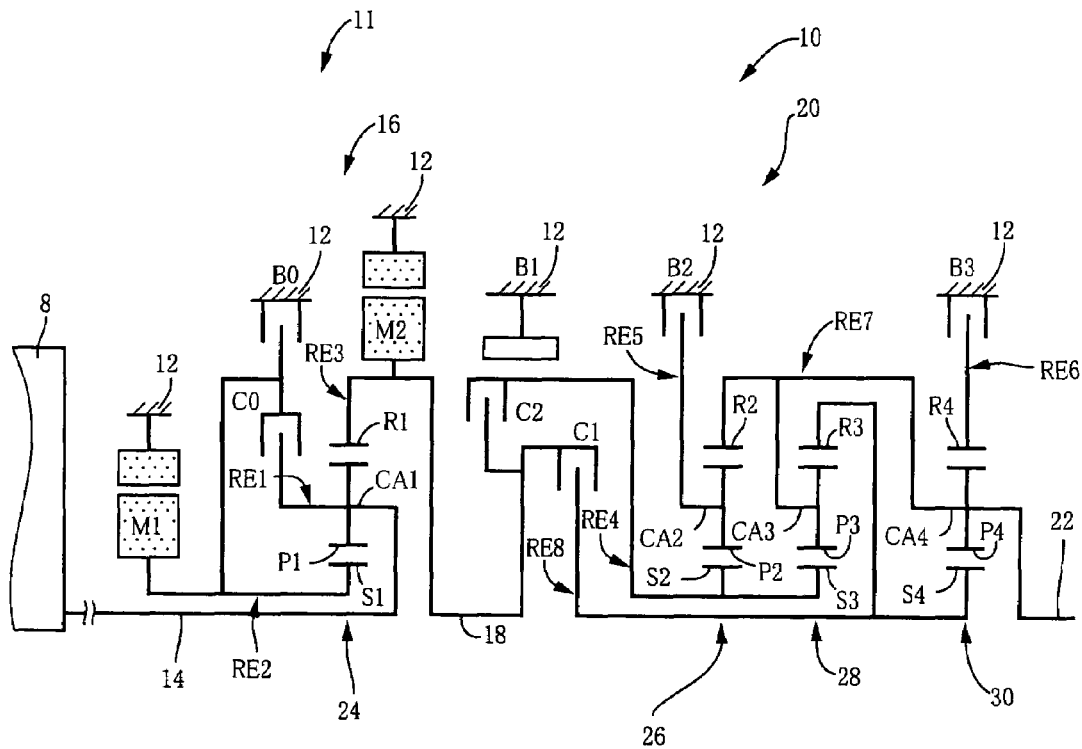
FIG. 1 is a schematic view showing an arrangement of a drive system for a hybrid vehicle, which is constructed according to one embodiment of the present invention.
FIG. 2 is a table indicating shifting actions of the hybrid vehicle drive system of the embodiment of FIG. 1, which is operable in a selected one of a continuously-variable shifting state and a step-variable shifting state, in relation to different combinations of operating states of hydraulically operated frictional coupling devices to effect the respective shifting actions.
Figure 5:
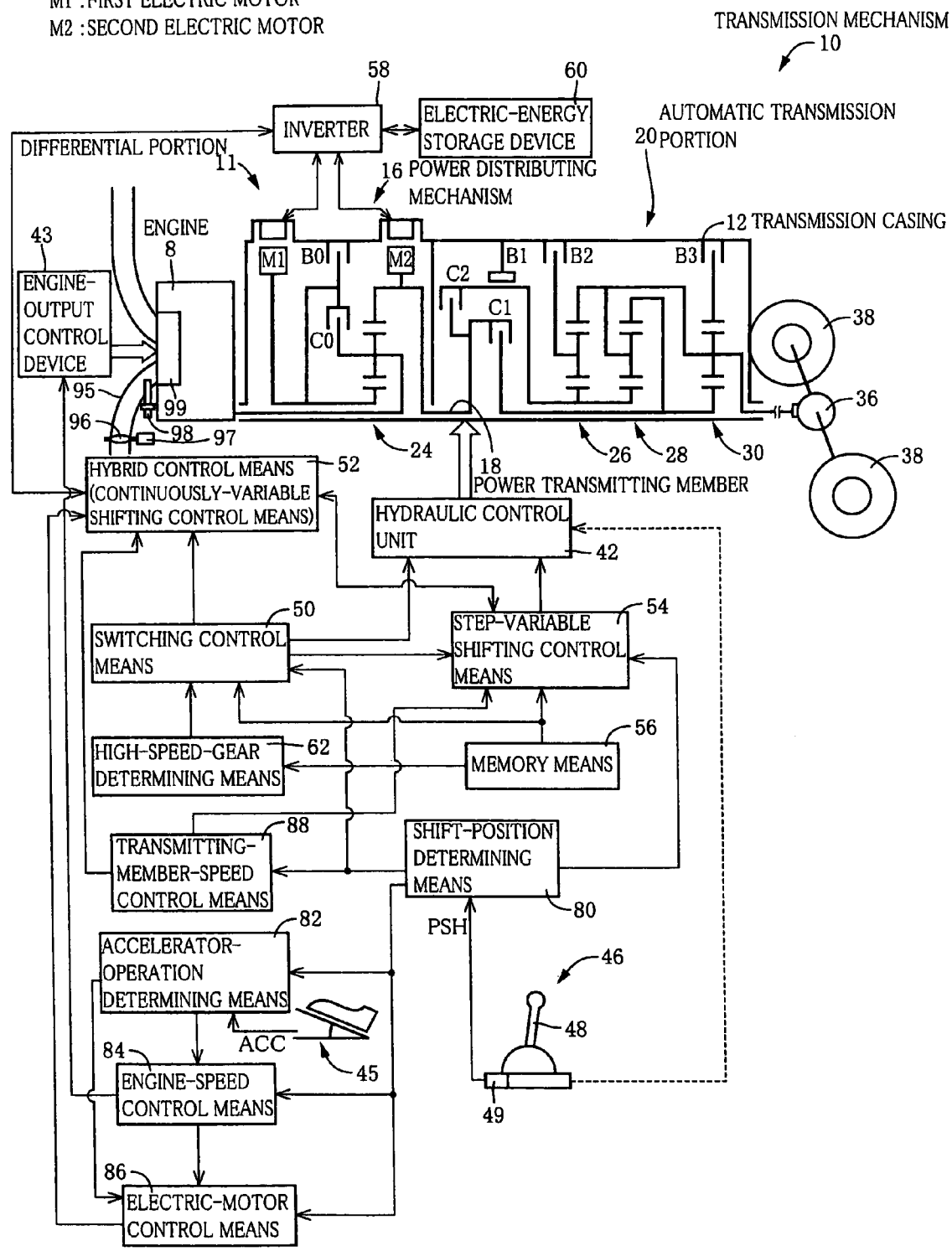
FIG. 5 is a functional block diagram illustrating major control functions of the electronic control device of FIG. 4.

Referring to the schematic view of FIG. 1, there is sown a drive mechanism 10 constituting a part of a drive system for a hybrid vehicle, which drive system is controlled by a control device according to one embodiment of this invention. As shown in FIG. 1, the transmission mechanism 10 includes an input rotary member in the form of an input shaft 14, a differential portion 11, an automatic transmission portion 20, and an output rotary member in the form of an output shaft 22, which are disposed on a common axis in a transmission casing 12 functioning as a stationary member attached to a body of the vehicle. The differential portion 11 is connected to the input shaft 14 either directly, or indirectly via a pulsation absorbing damper (vibration damping device) not shown. The automatic transmission portion 20 is a transmission portion functioning as a step-variable transmission interposed in a power transmitting path between the differential portion 11 and drive wheels 38, and is connected in series to the differential portion 11 via a power transmitting member 18 (power transmitting shaft). The output shaft 22 is connected to the automatic transmission portion 20. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed-reduction device) and a pair of drive axles, as shown in FIG. 5. The engine 8 may be a gasoline engine or diesel engine and functions as a vehicle drive power source directly connected to the input shaft 14 or indirectly via the pulsation absorbing damper not shown.

In the present transmission mechanism 10, the engine 8 and the differential portion 11 are connected to each other directly or indirectly through the pulsation absorbing damper, as described above, but a fluid-operated power transmitting device such as a torque converter or fluid coupling is not interposed between the engine 8 and the transmission portion 11. It is noted that the transmission mechanism 10 is constructed symmetrically with respect to its axis, and that the lower half of the transmission mechanism is not shown in the schematic view of FIG. 1. This is also true to the other embodiments of this invention which will be described.

The differential portion 11 includes: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 the output shaft of which is rotated with the power transmitting member 18. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio $\rho 1$ of about 0.418, for example, a switching clutch C0 and a switching brake B1. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the transmission casing 12, and the switching clutch C0 is disposed between the first sun gear S1 and the first carrier CA1. When the switching clutch C0 and brake B0 are both released, the power distributing mechanism 16 is placed in a differential state in which the first sun gear S1, first carrier CA1 and first ring gear R1 of the first planetary gear set 24 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in a continuously-variable shifting state (electrically established CVT state), in which the rotating speed of the power transmitting member 18 is continuously variable, irrespective of the rotating speed of the engine 8, namely, placed in the differential state in which a speed ratio $\gamma 0$ (rotating speed of the input shaft 14/rotating speed of the power transmitting member 18) of the power distributing mechanism 16 is continuously changed from a minimum value $\gamma 0\min$ to a maximum value $\gamma 0\max$, that is, in the continuously-variable shifting state in which the power distributing mechanism 16 functions as an electrically controlled continuously variable transmission the speed ratio $\gamma 0$ of which is continuously variable from the minimum value $\gamma 0\min$ to the maximum value $\gamma 0\max$.

When the switching clutch C0 or brake B0 is engaged while the power distributing mechanism 16 is placed in the continuously-variable shifting state, the mechanism 16 is brought into a non-differential state in which the differential function is not available. Described in detail, when the switching clutch C0 is engaged, the first sun gear S1 and the first carrier CA1 are connected together, so that the power distributing mechanism 16 is placed in a locked state or the non-differential state in which the three rotary elements of the first planetary gear set 24 consisting of the first sun gear S1, first carrier CA1 and first ring gear R1 are rotatable as a unit, so that the differential portion 11 is also placed in the non-differential state. In this non-differential state, the rotating speed of the engine 8 and the rotating speed of the power transmitting member 18 are made equal to each other, so that the power distributing mechanism 16 is placed in a fixed-speed-ratio shifting state or step-variable shifting state in which the mechanism 16 functions as a transmission having a fixed speed ratio $\gamma 0$ equal to 1. When the switching brake B0 is engaged in place of the switching clutch C0, the first sun gear S1 is fixed to the transmission casing 12, so that the power distributing mechanism 16 is placed in the locked or non-differential state in which the first sun gear S1 is not rotatable. Since the rotating speed of the first ring gear R1 is made higher than that of the first carrier CA1, the differential portion 11 is placed in the fixed-speed-ratio shifting state or step-variable shifting state in which the mechanism 16 functions as a speed-increasing transmission having a fixed speed ratio $\gamma 0$ smaller than 1, for example, about 0.7. Thus, the frictional coupling devices in the form of the switching clutch C0 and brake B0 function as a differential-state switching device operable to selectively place the differential portion 11 (power distributing mechanism 16) selectively in the differential state and the non-differential state, that is, in the continuously-variable shifting state (differential state) in which the differential portion 11 (power distributing mechanism 16) is operable as an electrically controlled continuously variable transmission, for example, as a continuously variable transmission the speed ratio of which is continuously variable, and in the locked state in which the differential portion 11 is not operable as the continuously variable transmission but functions as a transmission the speed ratio of which is kept unchanged, that is, in the fixed-speed-ratio shifting state (non-differential state) in which the differential portion 11 is not operable as the electrically controlled continuously variable transmission, but functions as a transmission having a single gear position with one speed ratio or a plurality of gear positions with respective to or more speed ratios, namely, in the fixed-speed-ration shifting state in which the differential portion 11 functions as a transmission having one gear position or a plurality of gear positions having fixed speed ratio or ratios.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio $\rho 4$ of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the transmission casing 12 through a first brake B1. The second carrier CA2 is selectively fixed to the transmission casing 12 through a second brake B2, and the fourth ring gear R4 is selectively fixed to the transmission casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1. Thus, the automatic transmission portion 20 and the power transmitting member 18 are selectively connected to each other through the first clutch C1 or second clutch C2, which is used to establish gear positions of the automatic transmission portion 20. In other words, the first and second clutches C1, C2 cooperate to function as coupling devices operable to switch a power transmitting path connecting the power transmitting member 18 and the automatic transmission portion 20 (connecting the differential portion 11 (power transmitting member 18) and the drive wheels 38), between a power-transmitting state in which a vehicle drive force can be transmitted through the power transmitting path, and a power-cutoff state in which the vehicle drive force cannot be transmitted through the power transmitting path. That is, the power transmitting path is placed in the power-transmitting state when at least one of the first and second clutches C1, C2 is engaged, and is placed in the power-cutoff state when the first and second clutches C1, C2 are both released.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first gear position (first speed position) through a fifth gear position (fifth speed position), a reverse gear position (rear drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those positions have respective speed ratios γ (input shaft speed $N_{IN}$/output shaft speed $N_{OUT}$) which change as geometric series. In particular, it is noted that the power distributing mechanism 16 is provided with the switching clutch C0 and brake B0 so that the differential portion 11 can be selectively placed by engagement of the switching clutch C0 or switching brake B0, in the fixed-speed-ratio shifting state in which the differential portion 11 is operable as a transmission having a single gear position with one speed ratio or a plurality of gear positions with respective speed ratios, as well as in the continuously-variable shifting state in which the differential portion 11 is operable as a continuously variable transmission, as described above. In the present transmission mechanism 10, therefore, a step-variable transmission is constituted by the automatic transmission portion 20, and the differential portion 11 which is placed in the fixed-speed-ratio shifting state by engagement of the switching clutch C0 or switching brake B0. Further, a continuously variable transmission is constituted by the automatic transmission portion 20, and the differential portion 11 which is placed in the continuously-variable shifting state, with none of the switching clutch C0 and brake B0 being engaged. In other words, the transmission mechanism 10 is switched to the step-variable shifting state by engaging one of the switching clutch C0 and switching brake B0, and switched to the continuously-variable shifting state by releasing both of the switching clutch C0 and brake B0. The differential portion 11 is also considered to be a transmission switchable between the step-variable shifting state and the continuously-variable shifting state.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the differential portion 11 functions as the continuously variable transmission, while the automatic transmission portion 20 connected in series to the differential portion 11 functions as the step-variable transmission, whereby the speed of the rotary motion transmitted to the automatic transmission portion 20 placed in one of the first through fourth gear positions, namely, the rotating speed of the power transmitting member 18 is continuously changed, so that the speed ratio of the drive system when the automatic transmission portion 20 is placed in one of those gear positions is continuously variable over a predetermined range. Accordingly, the speed ratio of the automatic transmission portion 20 is continuously variable across the adjacent gear positions, whereby the overall speed ratio γT of the transmission mechanism 10 is continuously variable.

Figure 3:
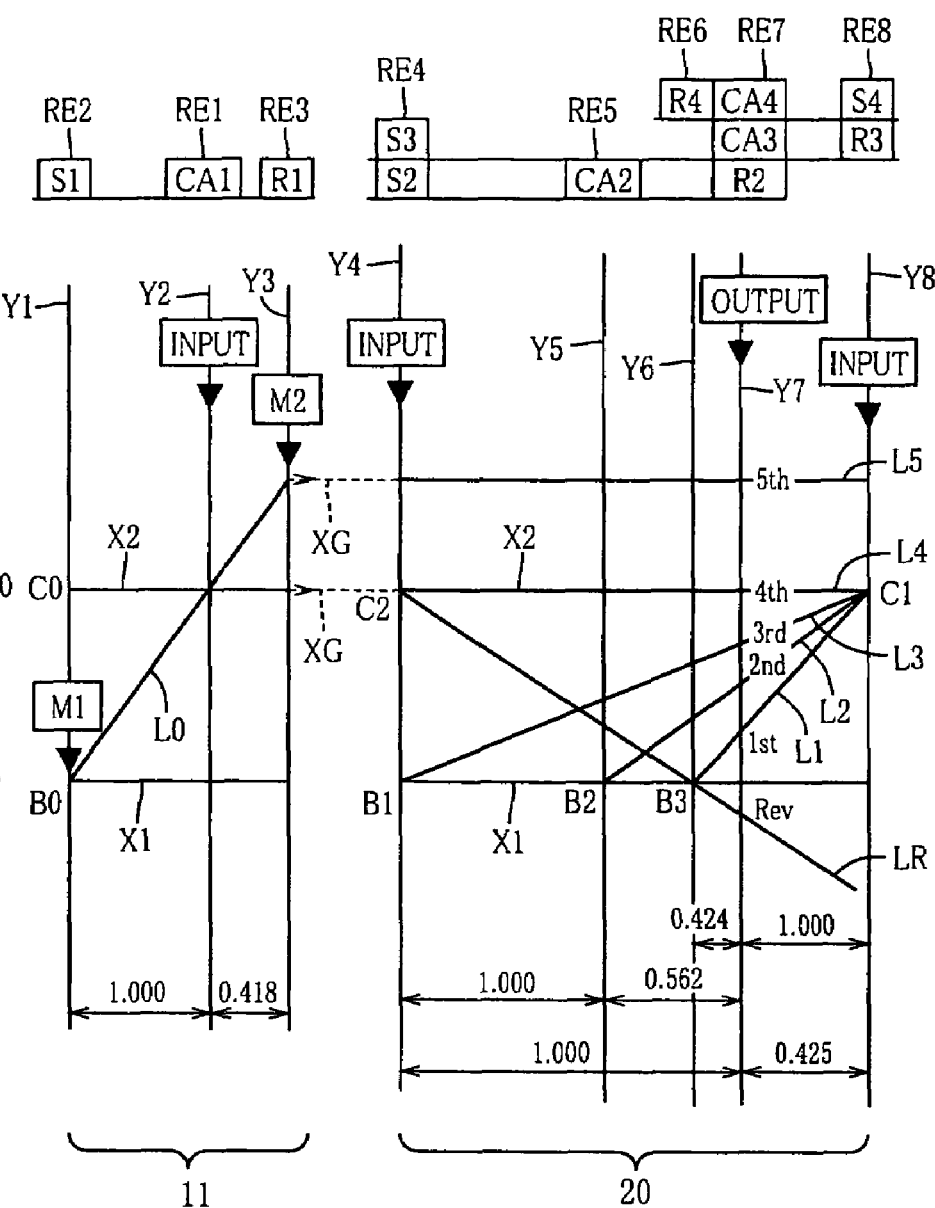
FIG. 3 is a collinear chart indicating relative rotating speeds of rotary elements of the drive system of the hybrid vehicle drive system of the embodiment of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the differential portion 11 functioning as the continuously-variable shifting portion or first shifting portion, and the automatic transmission portion 20 functioning as the step-variable shifting portion or second shifting portion. The collinear chart of FIG. 3 is a rectangular two-dimensional coordinate system in which the gear ratios $\rho$ of the planetary gear sets 24, 26, 28, 30 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 which are arranged in the right direction and which correspond to the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio $\rho 1$ of the first planetary gear set 24. That is, the distance between the vertical lines Y1 and Y2 corresponds to "1", while the distance between the vertical lines Y2 and Y3 corresponds to the gear ratio $\rho 1$. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines Y4-Y8 are determined by the gear ratios $\rho 2$, $\rho 3$ and $\rho 4$ of the second, third and fourth planetary gear sets 26, 28, 30. That is, the distances between the sun gear and carrier of each of the second, third and fourth planetary gear sets 26, 28, 30 corresponds to "1", while the distances between the carrier and ring gear of each of those planetary gear sets 26 28, 30 corresponds to the gear ratio $\rho$. In the automatic transmission portion 20, the distance between the sun gear and carrier of each of the second, third and fourth planetary gear sets 26, 28, 30 corresponds to "1", while the distance between the carrier and the ring gear corresponds to the gear ratio $\rho$.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the transmission casing 12 through the switching brake B0, while the third rotary element RE3 (first ring gear R1) is fixed to the power transmitting member 18 and the second electric motor M2, so that a rotary motion of the input shaft 14 is transmitted to the automatic transmission 20 (step-variable transmission portion) through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state by releasing actions of the switching clutch C0 and brake B0, for instance, the rotating speed of the first sun gear S1 represented by a point of intersection between the line L0 and the vertical line Y1 is raised or lowered by controlling the reaction force generated by an operation of the first electric motor M1 to generate an electric energy, so that the rotating speed of the first ring gear R1 represented by a point of intersection between the line L1 and the vertical line Y3 is lowered or raised. When the switching clutch C0 is engaged, the first sun gear S1 and the first carrier CA1 are connected to each other, and the power distributing mechanism 16 is placed in the non-differential state in which the above-indicated three rotary elements are rotated as a unit, so that the line L0 is aligned with the horizontal line X2, so that the power transmitting member 18 is rotated at a speed equal to the engine speed $N_E$. When the switching brake B0 is engaged, on the other hand, the rotation of the first sun gear S1 is stopped, and the power distributing mechanism 16 is placed in the non-differential state and functions as the speed-increasing mechanism, so that the line L0 is inclined in the state indicated in FIG. 3, whereby the rotating speed of the first ring gear R1, that is, the rotation of the power transmitting member 18 represented by a point of intersection between the lines L0 and Y3 is made higher than the engine speed $N_E$ and transmitted to the automatic transmission portion 20.

In the automatic transmission portion 20, the fourth rotary element RE4 is selectively connected to the power transmitting member 18 through the second clutch C2, and selectively fixed to the transmission casing 12 through the first brake B1, and the fifth rotary element RE5 is selectively fixed to the transmission casing 12 through the second brake B2, while the sixth rotary element RE6 is selectively fixed to the transmission casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element REG and the horizontal line X1, as shown in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the power distributing mechanism 16. When the switching clutch B0 is engaged in place of the switching clutch C0, on the other hand, the eighth rotary element RE8 is rotated at a speed higher than the engine speed $N_E$, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
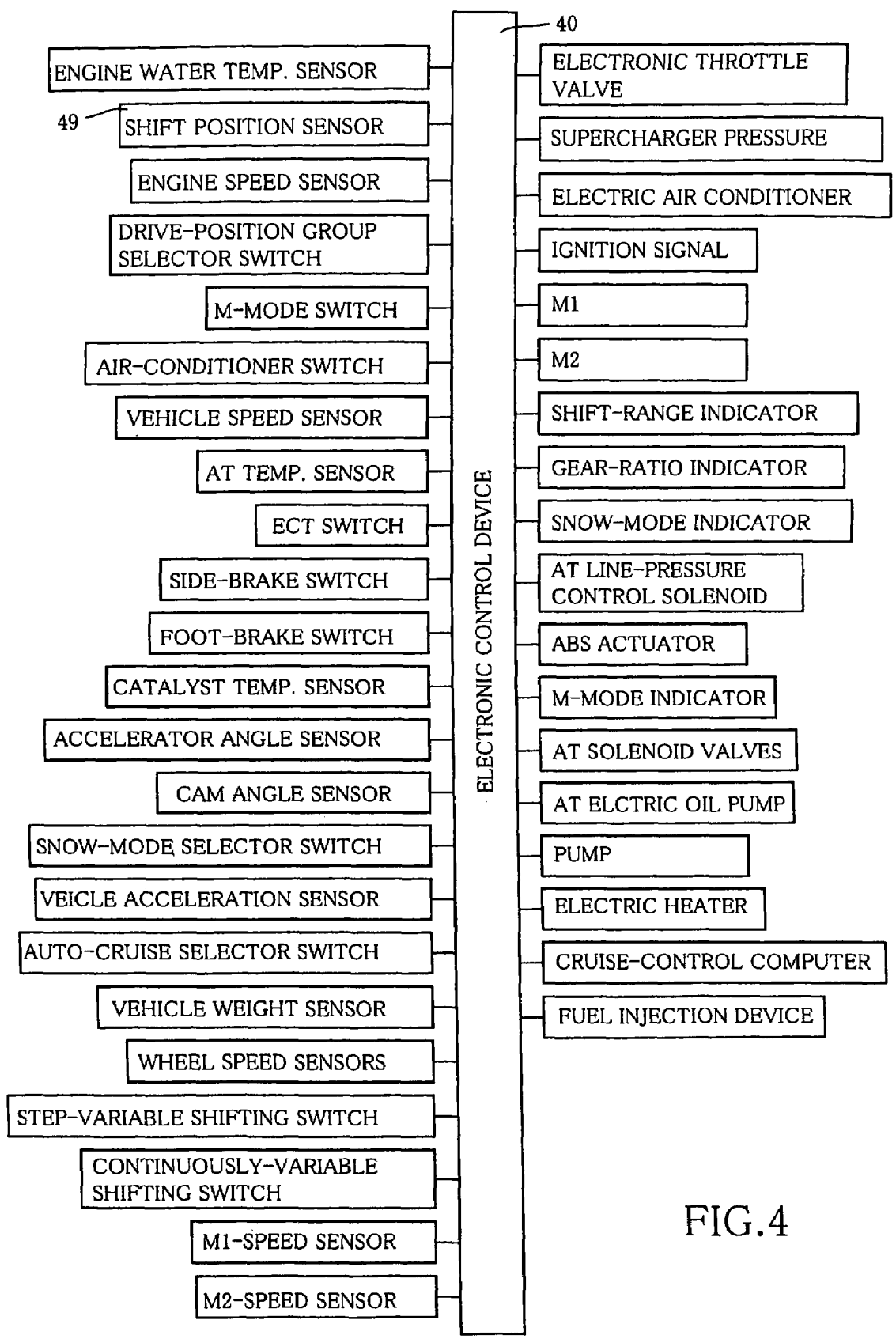
FIG. 4 is a view indicating input and output signals of an electronic control device provided in the drive system of the embodiment of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the automatic transmission portion 20.

The electronic control device 40 is arranged to receive, from various sensors and switches shown in FIG. 4, various signals such as: a signal indicative of a temperature TEMPw of cooling water of the engine; a signal indicative of a presently selected operating position $P_{SH}$ of a shift lever; a signal indicative of the operating speed $N_E$ of the engine 8; a signal indicative of a value indicating a selected group of forward-drive positions of the transmission mechanism; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an operating amount $A_{CC}$ of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the differential portion 11 (power distributing mechanism 16) in the fixed-speed-ratio shifting state in which the transmission mechanism 10 functions as a step-variable transmission; a signal indicative of a continuously-variable shifting switch provided to place the differential portion 11 (power distributing mechanism 16) in the continuously variable-shifting state in which the transmission mechanism 10 functions as the continuously variable transmission; a signal indicative of a rotating speed $N_{M1}$ of the first electric motor M1 (hereinafter referred to as "first electric motor speed $N_{M1}$"); and a signal indicative of a rotating speed $N_{M2}$ of the second electric motor M2 (hereinafter referred to as "second electric motor speed $N_{M2}$").

The electronic control device 40 is further arranged to generate various control signals to be applied to an engine-output control device 43, to control the engine output, such as: a signal to drive a throttle actuator 97 for controlling an angle of opening of an electronic throttle valve 96 disposed in an intake pipe 95 of the engine 8; a signal to control a fuel injection device 98 for controlling an amount of injection of a fuel into the above-indicated intake pipe 95 or into the cylinders of the engine 8; a signal to control an ignition device 99 for controlling a timing of ignition of the engine 8; a signal to adjust a pressure of a supercharger; a signal to operate the electric air conditioner; signals to operate the electric motors M1 and M2; a signal to operate a shift-range indicator for indicating the selected operating position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 provided to control the hydraulic actuators of the hydraulically operated frictional coupling devices of the differential portion 11 and the automatic transmission portion 20; a signal to operate an electric oil pump used as a hydraulic pressure source for the hydraulic control unit 42; a signal to drive an electric heater; and a signal to be applied to a cruise-control computer.

Reference is now made to the functional block diagram of FIG. 5 for explaining major control functions of the electronic control device 40. Step-variable shifting control means 54 shown in FIG. 5 is arranged to determine whether a shifting action of the transmission mechanism 10 should take place. This determination is made on the basis of a detected state of the vehicle in the form of the detected vehicle speed V and a detected output torque $T_{OUT}$ of the automatic transmission portion 20, and according to a shifting boundary line map (shifting control map) which is stored in memory means 56 and is represented by solid lines and one-dot chain lines in FIG. 6. The step-variable shifting control means 54 commands the hydraulic control unit 42 to selectively engage and release the hydraulically operated frictional coupling devices except the switching clutch C0 and brake B0, for establishing the determined gear position according to the table of FIG. 2.

Hybrid control means 52 is arranged to control the engine 8 to be operated with high efficiency in the above-described continuously-variable shifting state of the transmission mechanism 10, that is, in the differential state of the differential portion 11, and to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electrically controlled continuously variable transmission. For instance, the hybrid control means 52 calculates the output as required by the vehicle operator at the present running speed of the vehicle, on the basis of the operating amount $A_{CC}$ of the accelerator pedal and the vehicle running speed V, and calculate a required total vehicle output on the basis of the calculated required output and a required amount of generation of an electric energy by the electric motor. The hybrid control means 52 calculates a desired engine output, so as to obtain the calculated required total vehicle output, while taking into account of a loss of power transmission, load acting on devices optionally provided, and an assisting torque generated by the second electric motor M2. The hybrid control means 52 controls the engine 8 and the amount of generation of electric energy by the first electric motor M1, so as to establish the engine speed $N_E$ and torque $T_E$ at which the desired engine output is obtained. In other words, the hybrid control means 52 is able to control the engine speed $N_E$ for a given value of the vehicle running speed V and for a given speed ratio of the automatic transmission portion 20, that is, for a given speed of the power transmitting member 18, by controlling the amount of generation of the electric energy by the first electric motor M1.

The hybrid control means 52 is arranged to effect the above-described hybrid control while taking account of the presently selected gear position of the automatic transmission portion 20, so as to improve the drivability and fuel economy of the vehicle. In the hybrid control, the differential portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the automatic transmission portion 20. That is, the hybrid control means 52 determines a target value of the overall speed ratio γT of the transmission mechanism 10, so that the engine 8 is operated according to a stored highest-fuel-economy curve (fuel economy map or relationship). The target value of the overall speed ratio γT of the transmission mechanism 10 permits the engine torque $T_E$ and speed $N_E$ to be controlled so that the engine 8 provides an output necessary to drive the vehicle with the desired vehicle output. The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control means 52 controls the speed ratio γ0 of the differential portion 11, so as to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2.

It is also noted that the hybrid control means 52 is capable of establishing a so-called "motor starting and drive" mode in which the vehicle is started and driven by only the electric motor (e.g., second electric motor M2) used as the drive power source, by utilizing the electric CVT function (differential function) of the differential portion 11, irrespective of whether the engine 8 is in the non-operated state. Where the vehicle is started or driven by the electric motor, the hybrid control means 52 controls the first electric motor M1 to operate at a negative speed NM1 or to freely operate, for holding the engine speed NE at zero or substantially zero, owing to the differential function of the differential portion 11, for reducing the dragging phenomenon of the non-operated engine 8, so as to improve the fuel economy. The vehicle starting or running by the electric motor under the hybrid control means 52 is effected when the output torque $T_{OUT}$ is comparatively low, namely, when the engine torque $T_E$ is comparatively low, or when the vehicle speed V is comparatively low, namely, when the vehicle load is comparatively low. Generally, the engine operating efficiency is lower when the engine torque is low than when the engine torque is high.

The hybrid control means 52 is further capable of holding the engine 8 in an operated state owing to the electric CVT function of the differential portion 11, irrespective of whether the vehicle is stationary or running at a relatively low speed. For example, the first electric motor M1 is required to be operated by the drive force of the engine 8, to generate an electric energy, when an amount of electric energy SOC stored in the electric-energy storage device 60 is reduced while the vehicle is stationary. In this case, the speed of the first electric motor M1 is raised, so that the differential function of the power distributing mechanism 16 permits the engine speed $N_E$ to be held higher than a lower limit above which the engine 8 is operable, even if the second electric motor speed $N_{M2}$ determined by the vehicle speed V is lowered to zero (substantially zero) while the vehicle is stationary.

The hybrid control means 52 is further capable of holding the engine speed $N_E$ constant at a given value owing to the electric CVT function of the differential portion 11, by controlling the operating speed $N_{M1}$ of the first electric motor M1 and/or the operating speed $N_{M2}$ of the second electric motor M2, irrespective of whether the vehicle is stationary or running. To raise the engine speed $N_E$, for example, the hybrid control means 52 controls the first electric motor speed $N_{M1}$ to be raised while the second electric motor speed $N_{M2}$ determined by the vehicle speed V is held substantially constant, as is apparent from the collinear chart of FIG. 3.

The hybrid control means 52 is further capable of holding the first electric motor M1 and the second electric motor M2 in the non-load state, by cutting a supply of an electric current from the electric-energy storage device 60 to the first electric motor M1 and the second electric motor M2 through the inverter 58. In the non-load state of the first electric motor M1 and the second electric motor M2, these electric motors can be freely operated, and the differential portion 11 is not able to transmit a torque, that is placed in a state similar to the power-cutoff state in which the power transmitting path is disconnected within the differential portion 11. That is, the hybrid control means 52 is capable of placing the first electric motor M1 and the second electric motor M2 in the non-load state, for thereby placing the differential portion 11 in a neutral state in which the power transmitting path is electrically disconnected.

Figure 6:
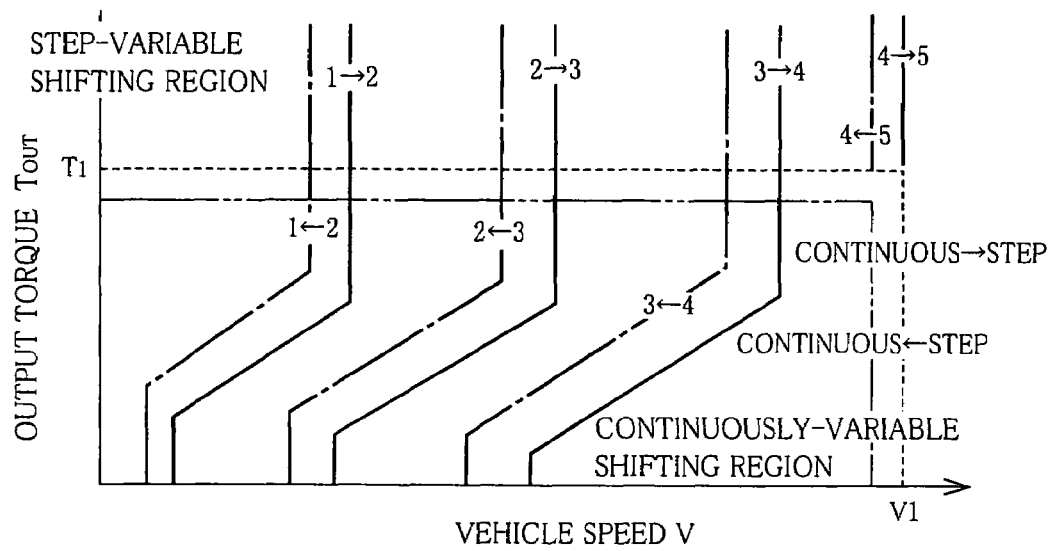
FIG. 6 is a view illustrating a stored shifting boundary line map used for determining a shifting action of an automatic transmission portion, in a two-dimensional coordinate system defined by axes a vehicle speed and an output torque as control parameters, and a stored switching boundary line map in the same coordinate system, which is used for switching the transmission mechanism between the step-variable shifting state and the continuously-variable shifting state.

High-speed-gear determining means 62 is arranged to determine whether the gear position to which the transmission mechanism 10 should be shifted according to the shifting boundary line map of FIG. 6 stored in the memory means 56 is a high-speed-gear position, for example, the fifth gear position. This determination is made to determine which one of the switching clutch C0 and the switching brake B0 should be engaged to place the transmission mechanism 10 in the step-variable shifting state.

Switching control portion 50 is arranged to determine whether the shifting state of the transmission mechanism 10 should be changed, that is, whether the detected vehicle condition represented by the vehicle speed V and the output torque $T_{OUT}$ is in a continuously variable shifting region for placing the transmission mechanism 10 in the continuously-variable shifting state, or in a step-variable shifting region for placing the transmission mechanism 10 in the step-variable shifting state. This determination is made on the basis of the detected vehicle condition and according to a switching boundary line map (switching map or relationship) stored in the memory means 56. An example of the switching boundary line map is indicated by broken and two-dot chain lines in FIG. 6. The switching control portion 50 selectively places the transmission mechanism 10 in the continuously-variable shifting state or step-variable shifting state, depending upon whether the present vehicle condition is in the continuously-variable shifting region or step-variable shifting region.

Described in detail, when the switching control portion 50 determines that the detected vehicle condition is in the step-variable shifting region, the switching control portion 50 disables the hybrid control means 52 to effect the hybrid control or continuously-variable shifting control, and enables the step-variable shifting control means 54 to effect a predetermined step-variable shifting control in which the automatic transmission portion 20 is automatically shifted according to the shifting boundary line map of FIG. 6 stored in the memory means 56, for example. In this step-variable shifting control, one of the gear positions of the automatic transmission portion 20 which is selected according to the shifting boundary line map of FIG. 6 is established by engaging the appropriate combination of the hydraulically operated frictional coupling devices C0, C1, C2, B0, B1, B2 and B3, as indicated in the table of FIG. 2, which indicates a predetermined relationship between each gear position of the transmission mechanism 10 and the corresponding combination of the frictional coupling devices. This relationship is stored in the memory means 56. Namely, the differential portion 11 and the automatic transmission portion 20 are operated as a so-called "step-variable automatic transmission" which is automatically shifted according to the predetermined relationship of FIG. 2.

When the high-speed-gear determining means 62 has determined that the transmission mechanism 10 should be shifted to the fifth gear position, for example, the switching control portion 50 commands the hydraulic control unit 42 to release the switching clutch C0 and engage the switching brake B0, for enabling the differential portion 11 to function as an auxiliary transmission having a fixed speed ratio $\gamma 0$ of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control portion 50 commands the hydraulic control unit 42 to engage the switching clutch C0 and release the switching brake B0, for enabling the differential portion 11 to function as an auxiliary transmission having a fixed speed ratio $\gamma 0$ of 1.0, for example, so that the transmission mechanism 10 as a whole is placed in a speed-reducing gear position having a speed ratio not lower than 1.0. Thus, the transmission mechanism 10 is switched to the step-variable shifting state by the switching control means 50, and is selectively placed in one of the two gear positions while the transmission mechanism 10 is placed in the step-variable shifting state. Thus, the differential portion 11 functions as the auxiliary transmission, while the automatic transmission portion 20 connected in series to the differential portion 11 functions as the step-variable transmission, so that the transmission mechanism 10 as a whole functions as the so-called "step-variable automatic transmission".

When the switching control portion 50 has determined that the detected vehicle condition is in the continuously-variable shifting region for placing the transmission mechanism 10 in the continuously-variable shifting state, the switching control portion 50 commands the hydraulic control unit 42 to release both of the switching clutch C0 and brake B0, for placing the differential portion 11 in the continuously-variable shifting state, to place the transmission mechanism 10 as a whole in the continuously-variable shifting state. At the same time, the switching control portion 50 enables the hybrid control means 52 to effect the hybrid control, and commands the step-variable shifting control means 54 to select and hold a predetermined one of the gear positions, or to permit an automatic shifting control according to the shifting boundary line map stored in the memory means 56. In the latter case, the variable-step shifting control means 54 effects the automatic shifting control by suitably selecting the combinations of the operating states of the frictional coupling devices indicated in the table of FIG. 2, except the combinations including the engagement of the switching clutch C0 and brake B0. Thus, the differential portion 11 functions as the continuously variable transmission while the automatic transmission portion 20 connected in series to the differential portion 11 functions as the step-variable transmission, so that the transmission mechanism 10 provides a sufficient vehicle drive force, such that the speed of the rotary motion transmitted to the automatic transmission portion 20 placed in one of the first through fourth gear positions, namely, the rotating speed of the power transmitting member 18 is continuously changed, so that the speed ratio of the transmission mechanism 10 when the automatic transmission portion 20 is placed in one of those gear positions is continuously variable over a predetermined range. Accordingly, the speed ratio of the automatic transmission portion 20 is continuously variable through the adjacent gear positions, whereby the overall speed ratio $\gamma T$ of the transmission mechanism 10 is continuously variable.

The maps shown in FIG. 6 will be described in detail. The shifting boundary line map (shifting map or relationship) shown in FIG. 6 by way of example is stored in the memory means 56 and is used for determining whether the automatic transmission 20 should be shifted. The shifting boundary line map is represented in a two-dimensional coordinate system defined by axes of control parameters in the form of the vehicle speed V and the required output torque $T_{OUT}$ used as a drive-force-related value. In FIG. 6, the solid lines indicate shift-up boundary lines, while the one-dot chain lines indicate shift-down boundary lines. Further, the broken lines of FIG. 6 indicate an upper vehicle-speed limit V1 and an upper output-torque limit T1 used by the switching control means 50 to determine whether the vehicle condition is in the step-variable shifting region and the continuously-variable shifting region. Namely, the broken lines of FIG. 6 are a high-speed-running determining line that is a series of high-speed-running threshold values predetermined as the upper vehicle-speed limit V1 used for determining whether the hybrid vehicle is in a high-speed running state, and a high-output-running determining line that is a series of high-output-running threshold values predetermined as the upper output-torque limit T1, which is used as the drive-force-related value relating to the drive force of the hybrid vehicle, for example, the output torque $T_{OUT}$ of the automatic transmission portion 20, for determining whether the hybrid vehicle is in a high-output running state. Further, two-dot chain lines in FIG. 6 indicate boundary lines offset with respect to the broken lines, by a suitable amount of control hysteresis, so that the broken lines and the two-dot chain lines are selectively used as the switching boundary lines between the step-variable shifting region and the continuously-variable shifting region. Thus, FIG. 6 shows the switching boundary line map (switching map or relationship) used by the switching control means 50 to determine whether the vehicle is in the step-variable shifting state or the continuously-variable shifting state, depending upon whether the vehicle speed V and the output torque $T_{OUT}$ are higher than the predetermined upper limit values V, T1. The shifting boundary line map and the switching boundary line map may be stored in the memory means 56, as a complex map. The switching boundary line map may include at least one of the boundary lines representative of the upper vehicle-speed limit V1 and the upper output-torque limit T1, and may use only one of the two parameters V and $T_{OUT}$.

The shifting boundary line map and the switching boundary line map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state, when the detected actual vehicle speed V has exceeded the upper limit V1, or when the detected output torque $T_{OUT}$ of the automatic transmission portion 20 has exceeded the upper limit T1. The switching control means 50 may be arranged to place the transmission mechanism 10 in the step-variable shifting state even when the vehicle condition is in the continuously-variable shifting region, upon detection of any functional deterioration or defect of the components such as the first and second electric motors M1, M2, inverter 58 and electric-energy storage device 60 which are associated with the electric path described above and which are operable to operate the differential portion 11 as the electrically controlled continuously variable transmission.

The drive-force-related value indicated above is a parameter corresponding to the drive force of the vehicle, which may be the output torque $T_{OUT}$ of the automatic transmission portion 20, the engine torque $T_E$ or an acceleration value of the vehicle, as well as a drive torque or drive force of drive wheels 38. The engine torque $T_E$ may be an actual value calculated on the basis of the accelerator pedal operating amount or the throttle valve opening angle (or intake air quantity, air/fuel ratio or amount of fuel injection) and the engine speed $N_E$, or an estimated value of the engine torque $T_E$ or required vehicle drive force which is calculated on the basis of the amount of operation of the accelerator pedal by the vehicle operator or the throttle valve operating angle. The vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper limit V1 of the vehicle speed is determined so that the transmission mechanism 10 is placed in the step-variable shifting state while the vehicle speed V is higher than the upper limit V1. This determination is effective to minimize a possibility of deterioration of the fuel economy of the vehicle if the transmission mechanism 10 were placed in the continuously-variable shifting state at a relatively high running speed of the vehicle. The upper limit T1 of the output torque $T_{OUT}$ is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 7:
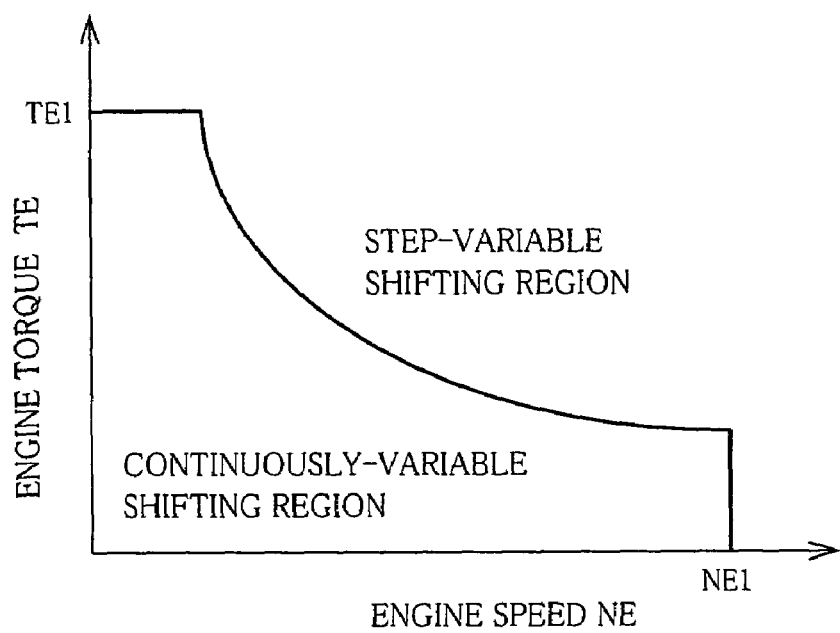
FIG. 7 is a view illustrating a shifting-region switching map indicating boundary lines defining a step-variable shifting region and a continuously-variable shifting region, the boundary lines of those shifting regions corresponding to boundary lines of the switching control map represented by broken lines in FIG. 6.

Referring to FIG. 7, there is shown a shifting-region switching map which is stored in the memory means 56 and which indicates boundary lines (switching map or relationship) defining the step-variable shifting region and continuously-variable shifting region in a two-dimensional coordinate system which is defined by axes of control parameters in the form of the engine speed $N_E$ and the engine torque $N_T$. The boundary lines of the shifting-region switching map are considered to be engine output lines. The switching control means 50 may use the shifting-region switching map of FIG. 7 in place of the switching boundary line map of FIG. 6, to determine, on the basis of by the engine speed $N_E$ and the engine torque $T_E$, whether the detected vehicle condition represented by the engine speed $N_E$ and the engine torque $T_E$ is in the continuously-variable or step-variable shifting region. The switching boundary line map of FIG. 6 which is indicated by the broken lines in FIG. 6 is based on the map of FIG. 7. In other words, the broken lines in FIG. 6 are switching boundary lines which are represented in the two-dimensional coordinate system defined by the axes of the control parameters in the form of the vehicle speed V and the output torque $T_{OUT}$, on the basis of the relationship (map) shown in FIG. 7.

Figure 8:
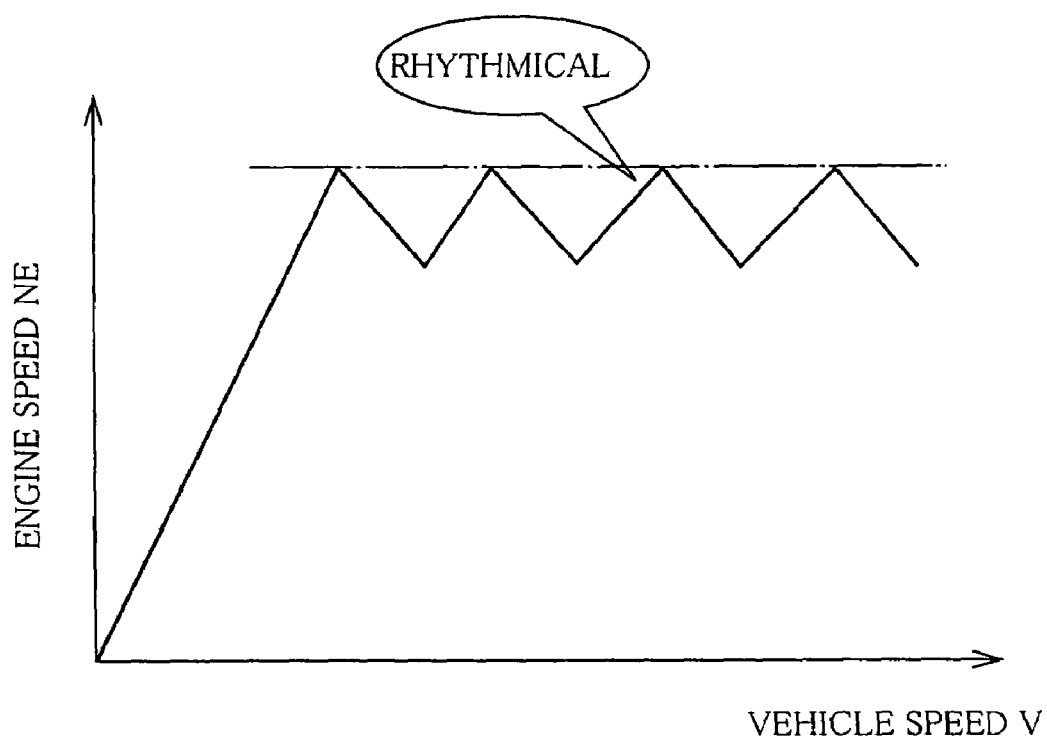
FIG. 8 is a view indicating an example of a change of the engine speed as a result of a shift-up action of the step-variable transmission.

The step-variable shifting region defined by the switching boundary line map of FIG. 6 is defined as a high-torque region in which the output torque $T_{OUT}$ is not lower than the predetermined upper limit $T_1$, or a high-speed region in which the vehicle speed V is not lower than the predetermined upper limit $V_1$. Accordingly, the step-variable shifting control is effected when the torque of the engine 8 is comparatively high or when the vehicle speed V is comparatively high, while the continuously-variable shifting control is effected when the torque of the engine 8 is comparatively low or when the vehicle speed V is comparatively low, that is, when the engine 8 is in a normal output state. Similarly, the step-variable shifting region defined by the shifting-region switching map of FIG. 7 is defined as a high-torque region in which the engine torque $T_E$ is not lower than the predetermined upper limit $T_{E1}$, or a high-speed region in which the engine speed $N_E$ is not lower than the predetermined upper limit $N_{E1}$, or alternatively defined as a high-output region in which the output of the engine 8 calculated on the basis of the engine torque $N_T$ and speed $N_E$ is not lower than a predetermined limit. Accordingly, the step-variable shifting control is effected when the torque $T_E$, speed $N_E$ or output of the engine 8 is comparatively high, while the continuously-variable shifting control is effected when the torque $T_E$, speed $N_E$ or output of the engine 8 is comparatively low, that is, when the engine 8 is in the normal output state. The boundary lines of the shifting-region switching map of FIG. 7 may be considered as high-speed threshold lines or high-engine-output threshold lines, which define upper limit of the vehicle speed V or engine output described above In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the hybrid vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the differential portion 11 (power distributing mechanism 16) functions as the electrically controlled continuously variable transmission. In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors. Alternatively, in the high-output running state of the vehicle, the transmission mechanism 10 is placed in the step-variable shifting state (fixed-speed-ratio shifting state), so that the engine speed $N_E$ changes with a shift-up action of the automatic transmission portion 20, assuring a comfortable rhythmic change of the engine speed $N_E$ as the automatic transmission portion 20 is shifted up, as indicated in FIG. 8. Stated in the other way, when the engine is in the high-output state, it is more important to satisfy a vehicle operator's desire to improve the drivability of the vehicle, than a vehicle operator's desire to improve the fuel economy. In this respect, the transmission mechanism 10 is switched from the continuously-variable shifting state to the step-variable shifting state (fixed-speed-ratio shifting state) when the engine output becomes relatively high. Accordingly, the vehicle operator is satisfied with a comfortable rhythmic change of the engine speed $N_E$ during the high-output operation of the engine, as indicated in FIG. 8.

Figure 9:
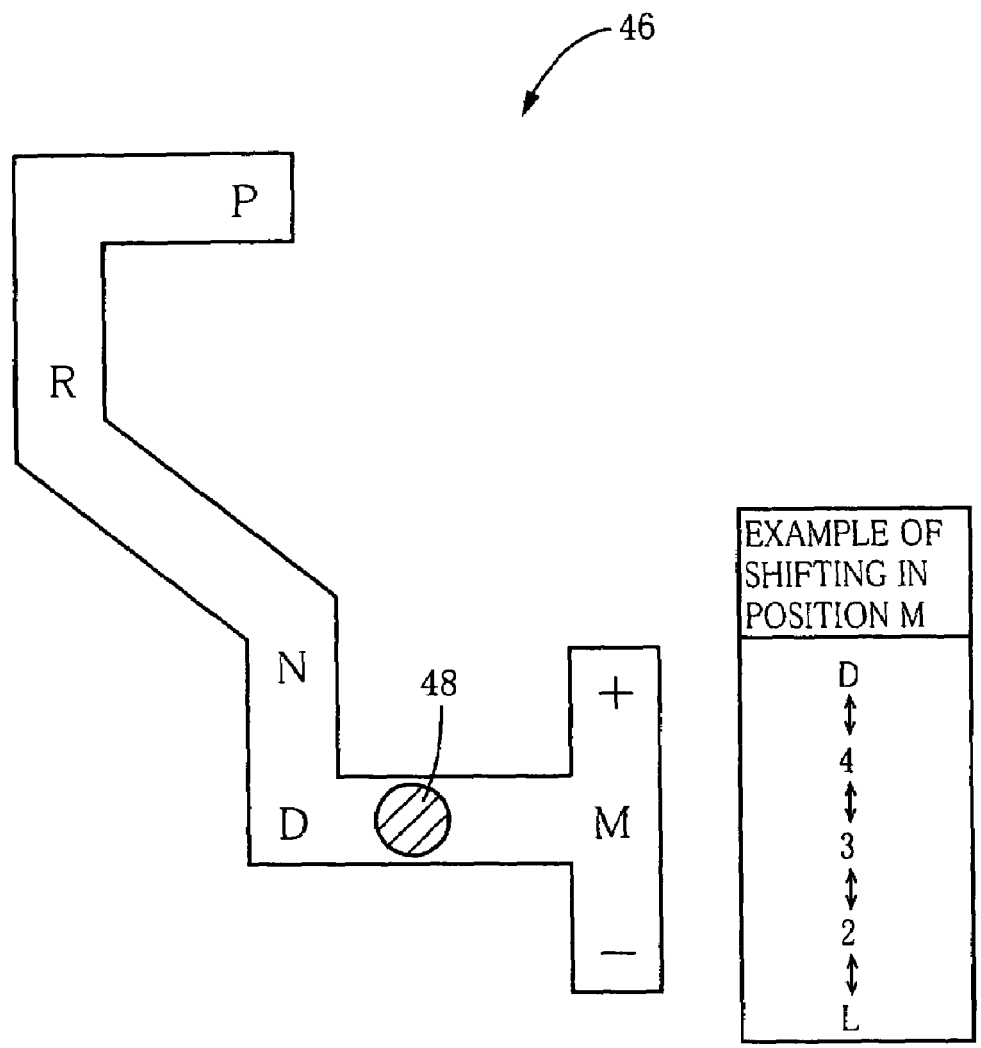
FIG. 9 is a view illustrating an example of a manually operable shifting device having a plurality of operating positions.

FIG. 9 shows an example of a manually operable shifting device in the form of a shifting device 46 including the above-described shift lever 48, which is disposed laterally adjacent to an operator's seat, for example, and which is manually operated to select one of a plurality of operating positions consisting of a parking position P for placing the transmission mechanism 10 (namely, automatic transmission 20) in a neutral state in which a power transmitting path is disconnected with both of the clutches C1 and C2 placed in the released state, while at the same time the output shaft 22 of the automatic transmission 20 is in the locked state; a reverse-drive position R for driving the vehicle in the rearward direction; a neutral position N for placing the transmission mechanism 10 in the neutral state; an automatic forward-drive position D; and a manual forward-drive position M.

When the shift lever 48 is operated to a selected one of the positions P, R, N, D and M, a manual valve incorporated in the hydraulic control unit 42 and operatively connected to the shift lever 48 is operated to establish the corresponding state of the hydraulic control unit 42. In the automatic forward-drive position D or the manual forward-drive position M, one of the first through fifth gear positions ($1^{st}$ through $5^{th}$) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 48 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 48 from the neutral position N to the automatic forward-drive position D causes at least the first clutch C1 to be engaged for switching the power transmitting path in the automatic transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 48 is operated to the manual forward-drive position M, for manually selecting one of the above-indicated positions "D" through "L". Described in detail, the shift lever 48 is movable from the manual forward-drive position M to a shift-up position "+" and a shift-down position "−", which are spaced from each other in the longitudinal direction of the vehicle. Each time the shift lever 48 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the automatic transmission portion 20 which are automatically selectable, so that the lowest overall speed ratio γT available is determined by the selected number of the gear positions. The shift lever 48 is biased by biasing means such as a spring so that the shift lever 48 is automatically returned from the shift-up position "+" and shift-down position "−" back to the manual forward-drive position M. The shifting device 46 is provided with a shift-position sensor 49 operable to detect the presently selected position of the shift lever 48, so that signals indicative of the presently selected operating position of the shift lever 48 and the number of shifting operations of the shift lever 48 in the manual forward-shifting position M.

When the shift lever 48 is operated to the automatic forward-drive position D, the switching control means 50 effects an automatic switching control of the transmission mechanism 10 according to the stored switching boundary line map indicated in FIG. 6, and the hybrid control means 52 effects the continuously-variable shifting control of the power distributing mechanism 16, while the step-variable shifting control means 54 effects an automatic shifting control of the automatic transmission 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the automatic transmission 20 is automatically controlled to select an appropriate one of the first through fourth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 48 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the positions "D" through "L". When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the automatic transmission 20 is automatically controlled to select an appropriate one of the gear positions the number of which is determined by the manually selected one of the positions "D" through "L", so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

Referring back to the block diagram of FIG. 5, shift-position determining means 80 is arranged to determine the presently selected position $P_{SH}$ of the shift lever 48, on the basis of the output signal of the shift-position sensor 49 indicative of the presently selected position $P_{SH}$. For example, the shift-position determining means 80 is arranged to determine whether the shift lever 48 is placed in the parking position P or neutral position N. Further, the shift-position determining means 80 is arranged to determine whether the shift lever 48 is operated from the neutral position N or parking position P to the reverse-drive position R or automatic forward-drive position D. In either of these cases, the determination by the shit-position determining means 80 is made on the basis of the output signal of the shift-position sensor 49 indicative of the presently selected position $P_{SH}$.

At least one of the first clutch C1 and the second clutch C2 is engaged as a result of a manual operation of the shift lever 48 from the neutral position N or parking position P to the reverse-drive position R or the forward-drive position D, that is, from the non-drive position to the drive position. If the engine is in operation at this time, the engine torque $T_E$ is transmitted to the drive wheels 38 through the automatic transmission portion 20. The risk of deterioration of the durability of the first clutch C1 and/or the second clutch C2 increases with an increase of the engine torque $T_E$ to be transmitted to the drive wheels 38 through the first clutch C1 and/or the second clutch C2 upon the manual operation of the shift lever 48 from the non-drive position to the drive position.

There will be described a control operation for reducing the deterioration of the durability of the first clutch C1 and/or the second clutch C2 due to the manual operation of the shift lever 48 from the non-drive position to the drive position. The engine 8 is in operation upon the manual operation of the shift lever 48 from the non-drive position to the drive position, in the following cases: where a warm-up operation of the engine 8 is necessary while the temperature of the engine cooling water is lower than a normal operating temperature; where an operation of the first electric motor M1 by the engine 8 is necessary to generate an electric energy for charging the electric-energy storage device 60 while the electric energy amount SOC stored in the electric-energy storage device 60 is smaller than a lower limit; where an operation of an optionally provided device such as an air conditioner by the engine 8 is necessary; and where the vehicle is in the engine-drive mode with the engine 8 used as the drive power source.

Accelerator-operation determining means 82 is arranged to determine whether an accelerator pedal 45 has been operated or not, while it is determined by the shift-position determining means 80 that the shift lever 48 is placed in the neutral position N or parking position P. This determination by the accelerator-operation determining means 80 is made by determining whether the actual operating amount $A_{CC}$ of the accelerator pedal 45 is larger than a predetermined value $A_{CC}'$. This predetermined value $A_{CC}'$ is stored in memory, as a threshold value of the operating amount $A_{CC}$ of the accelerator pedal 45 above which the accelerator pedal 45 is considered to have been operated by the user while the shift lever 48 is placed in the neutral position N or parking position P.

Engine-speed control means 84 is arranged to control the engine 8 such that the engine speed $N_E$ does not exceed a predetermined value $N_E'$, irrespective of the operation of the accelerator pedal 45, for reducing the deterioration of durability of the first clutch C1 and/or the second clutch C2 upon manual operation of the shift lever 48 from the non-drive position to the drive position, when it is determined by the accelerator-operation determining means 82 that the accelerator pedal 45 has been operated while the shift lever 48 is placed in the non-drive position, that is, while it is determined by the shift-position determining means 80 that the shift lever 48 is placed in the neural position N or parking position P.

For example, the engine-speed control means 84 controls the engine output to prevent the engine speed $N_E$ from exceeding the predetermined value $N_E'$, irrespective of the operation of the accelerator pedal 45. Described in detail, the engine-speed control means 84 commands the engine-output control device 43 to perform an operation to reduce the angle of opening of the electronic throttle valve 96, an operation to reduce the amount of injection of the fuel by the fuel injection device 98, or an operation to retard the timing of ignition of the engine 8 by the ignition device 99, or a combination of those operations, so that the engine speed $N_E$ does not exceed the predetermined value $N_E'$.

The predetermined engine speed value $N_E'$ indicated above is an upper limit value (e.g., 2000 r.p.m.) which is obtained by experimentation and stored in memory and below which it is possible to reduce an excessive rise of the engine speed $N_E$ (a racing phenomenon of the engine 8) due to the operation of the accelerator pedal 45 while the shift lever 48 is in the neutral position N or parking position P, so that the deterioration of durability of the first clutch C1 and/or the second clutch C2 due to the manual operation of the shift lever 48 from the non-drive position to the drive position.

Electric-motor control means 86 is arranged to command the hybrid control means 84 to inhibit the control of the engine speed $N_E$, when it is not determined by the accelerator-operation determining means 82 that the accelerator pedal 45 has been operated while the shift leer 48 is placed in the non-drive position, that is, while it is determined by the shift-position determining means 80 that the shift lever 48 is placed in the non-drive position, or after the engine speed $N_E$ has been controlled by the engine-speed control means 84 so as not to exceed the predetermined value $N_E'$. In these cases, the electric-motor control means 86 inhibits the control of the engine speed $N_E$, since it is not necessary for the hybrid control means 52 to control the engine speed $N_E$ so as not to exceed the predetermined value $N_E'$, by controlling the first electric motor M1 and/or the second electric motor M2. For instance, the electric-motor control 86 is arranged to command the hybrid control means 52 to place the first electric motor M1 and the second electric motor M2 in the non-load state, for thereby inhibiting the control of the engine speed $N_E$. According to the command from the electric-motor control means 86, the hybrid control means 52 cuts off a supply of the electric currents to the first electric motor M1 and the second electric motor M2, for thereby placing the first electric motor M1 and the second electric motor M2 in the non-load state.

The above-indicated operation to place the first electric motor M1 and the second electric motor M2 in the non-load state is effective to reduce a loss of electric energy applied to the electric motors, and the load acting on the engine 8, resulting in an improvement of the fuel economy of the engine 8. Further, the manual operation of the shift lever 48 from the non-drive position to the drive position while the differential portion 11 is placed in the electrically neutral state with the first and second electric motors M1, M2 being placed in the non-load state causes the first clutch C1 and/or the second clutch C2 to be engaged while no engine torque $T_E$ is transmitted through the drive system, that is, while the torque output from the differential portion 11 is substantially zero. Accordingly, the durability of the first clutch C1 and/or the second clutch C2 is further improved.

Transmitting-member-speed control means 88 is arranged to control the speed of the power transmitting member 18 by controlling the first electric motor M1 and/or the second electric motor M2, so as to permit the first clutch C1 and/or the second clutch C2 to be engaged with a reduced or restricted relative rotating speed of input and output members of the clutch C1, C2, when the shift lever 48 is operated from the non-drive position to the drive position, that is, when it is determined by the shift-position determining means 80 that the shift lever 48 has been operated from the neutral position N or parking position P to the reverse-drive position R or automatic forward-drive position D.

Described in detail, the above-indicated transmitting-member-speed control means 88 calculates a target value $N_{18}'$ of an input speed $N_{IN}$ of the automatic transmission portion 20 (=output shaft speed $N_{OUT}\times$gear ratio $\gamma$), that is, the target speed $N_{IS}'$ of the power transmitting member 18 in the process of the engaging action of the first clutch C1 and/or the second clutch C2, on the basis of the vehicle speed V and the gear ratio $\gamma$, so that the first clutch C1 and/or the second clutch C2 is engaged while the relative rotating speed of its input and output members is restricted. For instance, the transmitting-member-speed control means 88 is arranged to zero the target speed $N_{18}'$ of the power transmitting member 18 when the vehicle is stationary, that is, when the vehicle speed V is zero, and to calculate the target speed $N_{18}'$ on the basis of the vehicle speed V and the gear ratio of the presently established forward-drive gear position, for example, the gear ratio of the first gear position, when the shift lever 48 is operated to the forward-drive position D during a forward running of the vehicle.

The transmitting-member-speed control means 88 commands the hybrid control means 52 to control the first electric motor M1 and/or the second electric motor M2, for synchronous control of the second electric motor speed $N_{M2}$ such that the second electric motor speed $N_{M2}$ coincides with the target speed $N_{18}'$ of the power transmitting member 18. As a result, the first clutch C1 and/or the second clutch C2 is engaged upon the manual operation of the shift lever 48 from the non-drive position to the drive position, while the relative rotating speed of the input and output members of the clutch C1, C2 is restricted, so that the durability of the first clutch C1 and the second clutch C2 is improved, and/or the shifting shock upon the engaging action of the clutch C1, C2 is reduced. Further, the restriction or reduction of the relative rotating speed of the first clutch C1 and/or the second clutch C2 during the engaging action permits reduction of deterioration of the durability of the clutch, and/or reduction of the shifting shock, even where the engaging action is effected by fast application of the hydraulic pressure to the first clutch C1 and/or the second clutch C2, rather than a gradual increase of the hydraulic pressure of the clutch, by the hydraulic control unit 42 under the control of the step-variable shifting control means 54.

While the differential portion 11 which is operable in a selected one of its continuously-variable shifting state and its step-variable shifting state (fixed-speed-ratio shifting state) is placed in the step-variable shifting state, the first electric motor speed $N_{M1}$, second electric motor speed $N_{M2}$ and engine speed $N_E$ are bound by each other, and the cannot be freely controlled independently of each other. For instance, even when the first electric motor M1 and the second electric motor M2 are placed in the non-load state while the differential portion 11 is placed in the step-variable shifting state, the engine torque $T_E$ is transmitted to the power transmitting member 18, so that the differential portion 11 cannot be placed in the electrically neutral state.

In view of the above-described drawback, the switching control means 50 has not only the function described above, but also a function of commanding the hydraulic control unit 42 to release the switching clutch C0 and the switching brake B0 for placing the differential portion 11 in the continuously-variable shifting state, that is, for placing the power distributing mechanism 16 in the differential state, when the shift lever 48 is placed in the non-drive position, namely, when it is determined by the shift-position determining means 80 that the shift lever 48 is placed in the neutral position N or parking position P. Accordingly, the differential portion 11 can be placed in the electrically neutral state under the control of the electric-motor control means 86, or the second electric motor speed $N_{M2}$ can be controlled by controlling the first electric motor M1 and/or the second electric motor M2 under the control of the transmitting-member-speed control means 88.

Referring to the flow chart of FIG. 10, there will be described a major control function of the electronic control device 40, that is, a control routine for controlling the differential portion 11, so as to reduce the deterioration of durability of the first clutch C1 and/or the second clutch C2, when the shift lever 48 is operated from the presently selected non-drive position to the drive position during an operation of the engine 8. This control routine is repeatedly executed with an extremely short cycle time of about several milliseconds to about several tens of milliseconds, for example. FIG. 11 is the time chart for explaining the control routine illustrated in the flow chart of FIG. 10, which is executed upon a manual operation of the shift lever 48 from the neutral position N to the automatic forward-drive position D, namely, upon the N-to-D shifting operation.

The control routine is initiated with step S1 ("step" being hereinafter omitted) corresponding to the shift-position determining means 80, to determine whether the shift lever 48 is placed in the non-drive position N or P. This determination is made on the basis of the output signal of the shift-position sensor 49 indicative of the presently selected position $P_{SH}$ of the shift lever 48. If a negative decision is obtained in S1, the control flow goes to S8 wherein the control device 40 performs various controls other than the present control routine, or terminates one cycle of execution of the present control routine. Up to a point of time t2 indicated in FIG. 11, the negative decision is obtained in S1, with the shift lever 48 being placed in the neutral position N.

If an affirmative decision is obtained in S1, the control flow goes to S2 corresponding to the accelerator-operation determining means 82, to determine whether the accelerator pedal 45 has been operated. For example, this determination is made by determining whether the actual accelerator pedal operating amount $A_{CC}$ has exceeded the predetermined value $A_{CC}'$. After the affirmative decision is obtained in S1 and before the determination in S2 is made, a step which is not shown and which corresponds to the switching control means 50 is implemented to command the hydraulic control unit 42 to release the switching clutch C0 and the switching brake B0, for thereby placing the power distributing mechanism 16 in its differential state.

If an affirmative decision is obtained in S2, the control flow goes to S3 corresponding to the engine-speed control means 84, to control the output of the engine 8 such that the engine speed $N_E$ does not exceed the predetermined value $N_E'$, for example, about 2000 r.p.m., irrespective of the operation of the accelerator pedal 45, for inhibiting or reducing a racing phenomenon of the engine 8 due to the operation of the accelerator pedal 45. During a time period between a point of time t1 and the point of time t2 in FIG. 11, the engine speed $N_E$ is kept at a value not higher than the predetermined value $N_E'$, as a result of implementation of S3.

If a negative decision is obtained in S2, or after S3 is implemented, the control flow goes to S4 corresponding to the electric-motor control means 86, to command the hybrid control means 52 to inhibit the control of the first electric motor M1 and/or the second electric motor M2 for controlling the engine speed $N_E$ so as not to exceed the predetermined value $N_E'$. During the time period between the points of time t1 and t2 in FIG. 11, the first electric motor speed NM1 and the second electric motor speed NM2 are not controlled with the differential portion 11 placed in the neutral state. Subsequently, the control flow goes to S5 corresponding to the shift-position determining means 80, to determine whether the shift lever 48 has been operated from the neutral position N or parking position P to the reverse-drive position R or automatic forward-drive position D. This determination is made on the basis of the output signal of the shift-position sensor 49 indicative of the presently selected position $P_{SH}$ of the shift lever 45. If a negative decision is obtained in S5, the control flow goes back to S2. S2 through S4 are repeatedly implemented until an affirmative decision is obtained in S5. At the point of time t2 in FIG. 11, the affirmative decision is obtained in S4, with an operation of the shift lever 48 from the neutral position N to the forward-drive position D.

If the affirmative decision is obtained in S5, the control flow goes to S6 corresponding to the transmitting-member-speed control means 88, to calculate the target speed $N_{18}'$ of the power transmitting member 18 (=output shaft speed $N_{OUT}$×gear ratio γ) in the process of the engaging action of the first clutch C1 and/or the second clutch C2, on the basis of the vehicle speed V and the gear ratio. and then to command the hybrid control means 52 to control the first electric motor M1 and/or the second electric motor M2, for synchronous control of the second motor speed $N_{M2}$ such that the second electric motor speed $N_{M2}$ coincides with the target speed $N_{18}'$ of the power transmitting member 18. Subsequently, the control flow goes to S7 corresponding to the step-variable shifting control means 54, to command the hydraulic control unit 42 to effect the fast application of the hydraulic pressure to the first clutch C1 and/or the second clutch C2. During a time period between a point of time t3 and a point of time t4 in FIG. 11, the fast application of the hydraulic pressure to the first clutch C1 is effected after the second electric motor speed $N_{M2}$ becomes equal to the target speed $N_{18}'$.

In the above-described transmission mechanism 10 of the present embodiment including the differential portion 11 having the power distributing mechanism 16 having the differential function and further including the automatic transmission portion 20, the first clutch C1 and the second clutch C2 are provided as coupling devices to place the power transmitting path selectively in one of the power-transmitting state and the power-cutoff state, and the shift lever 48 is manually operable between the drive position (position D or R) for at least one of the coupling devices to place the power transmitting path in the power-transmitting state, and the non-drive position for the at least one coupling device to place the power transmitting path in the power-cutoff state. While the shift lever 48 is placed in the non-drive position, the engine-speed control means 84 controls the engine speed $N_E$ so as not to exceed the predetermined value $N_E'$, for thereby reducing the engine torque $T_E$ to be transmitted to the drive wheels 38 through the first clutch C1 and/or the second clutch C2 in the process of the engaging action which takes place as a result of the manual operation of the shift lever 48 from the non-drive position to the drive position, so that the first clutch C1 and/or the second clutch 2 is engaged while the engine torque $T_E$ is reduced, whereby the durability of the first clutch C1 and/or the second clutch C1 is improved, and/or the shifting shock due to the manual operation of the shift lever 48 is reduced.

The present invention is further arranged such that the operation of the engine-speed control means 84 to control the engine speed $N_E$ so as not to exceed the predetermined value $N_E'$ is performed by controlling the output of the engine 8, so that there is a reduced necessity to control the engine speed $N_E$ by operating the first electric motor M1 and/or the second electric motor M2. Therefore, the first electric motor M1 and the second electric motor M2 are placed in the non-load state under the control of the electric-motor control means 86, so that the loss of electric energy for controlling the electric motors is reduced, and the fuel economy is improved. Further, while the first electric motor M1 and the second electric motor M2 are placed in the non-load state under the control of the electric-motor control means 86, the differential portion 11 is placed in the electrically neutral state in which the differential portion 11 is not able to transmit the engine torque $T_E$, that is, the power transmitting path is in the power-cutoff state. Accordingly, upon the manual operation of the shift lever 48 from the non-drive position to the drive position, the first clutch C1 and/or the second clutch C2 is engaged while the engine torque $T_E$ is not transmitted through the power transmitting path, so that the durability of the first clutch C1 and/or the second clutch C2 is further improved, and/or the shifting shock is further reduced.

The present embodiment is further arranged such that the first clutch C1 and the second clutch C2 are provided to shift the automatic transmission portion 20, and the automatic transmission portion 20 is placed into the power-cutoff state by the releasing actions of the first clutch C1 and the second clutch C2, when the shift leer 48 is operated to the non-drive position. Accordingly, the power transmitting path can be easily placed into the power-cutoff state when the shift lever 48 is operated to the non-drive position.

The transmission mechanism 10 of the present embodiment is further arranged such that the differential portion 11 is provided with the switching clutch C9 and the switching brake B0 that are operable to place the differential portion 11 selectively in one of the differential state in which the power distributing mechanism 16 is operable as the electrically controlled continuously variable transmission, and the non-differential state in which the power distributing mechanism 16 is not operable as the electrically controlled continuously variable transmission, so that the power distributing mechanism 16 can be placed into the differential state under the control of the switching control means 50 when the shift lever 48 is operated to the non-drive position. In the differential or non-locked state of the power distributing mechanism 16, the rotary elements of the power distributing mechanism 16 are freely rotatable, so that the differential portion 11 can be placed in the electrically neutral state with the first electric motor M1 and the second electric motor M2 being placed in the non-load state under the control of the electric-motor control means 86.

Then, the other embodiments of this invention will be described. In the following description, the same reference signs as used in the preceding embodiment will be used to identify the same elements, which will not be described.

Embodiment 2

In the present embodiment, the above-described electric-motor control means 86 is arranged to command the hybrid control means 52 to place the first electric motor M1 and the second electric motor M2 in the non-load state for thereby inhibiting the control of the engine speed $N_E$ by controlling the first and second electric motors M1, M2, for the purpose of reducing the deterioration of durability of the first clutch C1 and/or the second clutch C2 upon the manual operation of the shift lever 48 from the non-drive position to the drive position, when it is determined by the accelerator-operation determining portion 82 that the accelerator pedal 45 has been operated while the shift lever 48 is placed in the non-drive position, that is, while it is determined by the shift-position determining portion 80 that the shift lever 48 is placed in the neutral position N or parking position P. According to the command received from the electric-motor control means 86, the hybrid control means 52 cuts off a supply of the electric currents to the first electric motor M1 and the second electric motor M2, for thereby placing the first and second electric motors M1, M2 in the non-load state.

By placing the first electric motor M1 and the second electric motor M2 in the non-load state, the loss of electric energy for controlling those electric motors can be reduced, or the load acting on the engine 8 can be reduced, to thereby improve the fuel economy of the engine 8. Further, when the first electric motor M1 and the second electric motor M2 are placed in the non-load state to place the differential portion 11 in the electrically neutral state, the first clutch C1 and/or the second clutch C2 is engaged as a result of the manual operation of the shift lever 48 from the non-drive position to the drive position, while the engine torque $T_E$ is not transmitted, that is, while the output torque of the differential portion 11 is substantially zero. Accordingly, the deterioration of durability of the first clutch C1 and/or the second clutch C2 can be reduced, and/or the shifting shock can be reduced, even if the engine speed $N_E$ has exceeded the predetermined value $_{NE'}$ as a result of an operation of the accelerator pedal 45.

Figure 10:
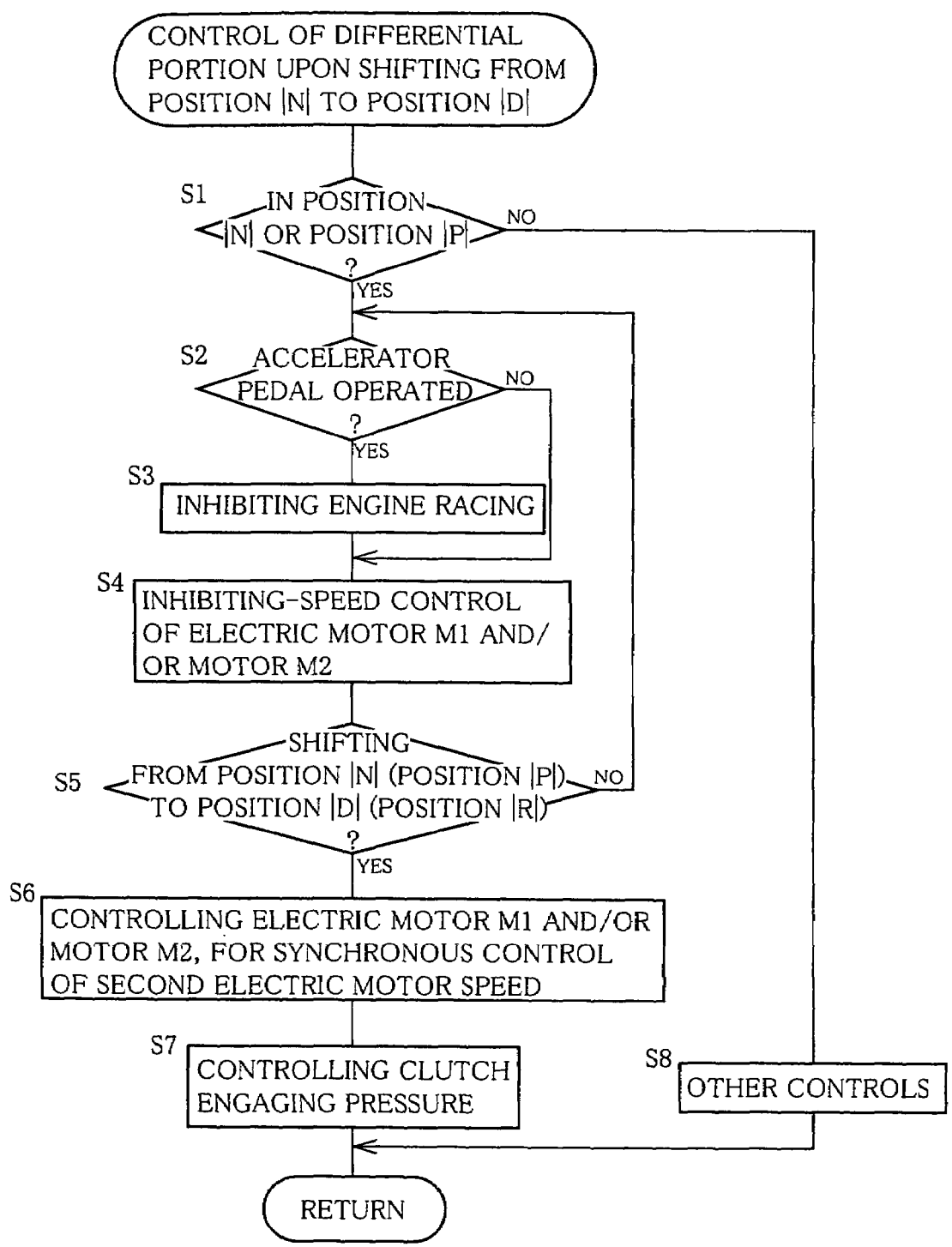
FIG. 10 is a flow chart illustrating a control routine executed by the electronic control device of FIG. 5 for controlling a differential portion so as to reduce deterioration of durability of a first clutch and/or a second clutch, upon shifting of a shift lever from a non-drive position to a drive position during an operation of an engine.
Figure 11:
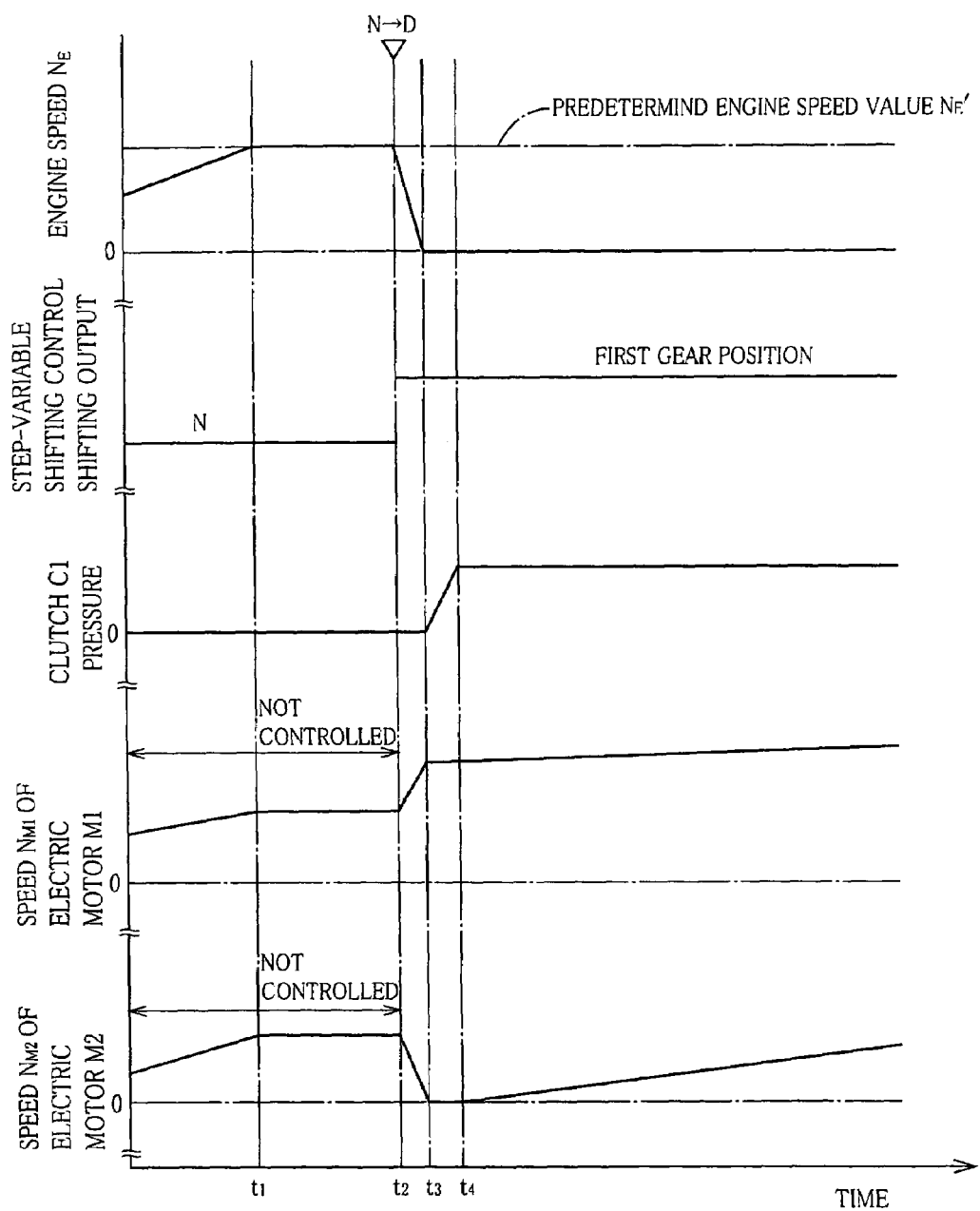
FIG. 11 is a time chart for explaining the control routine illustrated in the flow chart of FIG. 10.

In the present embodiment, the step S3 illustrated in the flow chart of FIG. 10 is replaced by a step corresponding to the electric-motor control means 86. In this step, the electric-motor control means 86 commands the hybrid control means 52 to place the first electric motor M1 and the second electric motor M2 in the non-load state, for thereby inhibit the control of the engine speed NE by controlling the first electric motor M1 and the second electric motor M2.

In the above-described transmission mechanism 10 of the present embodiment including the differential portion 11 having the power distributing mechanism 16 having the differential function and further including the automatic transmission portion 20, the first clutch C1 and the second clutch C2 are provided as coupling devices to place the power transmitting path selectively in one of the power-transmitting state and the power-cutoff state, and the shift lever 48 is manually operable between the drive position (position D or R) for at least one of the coupling devices to place the power transmitting path in the power-transmitting state, and the non-drive position for the at least one coupling device to place the power transmitting path in the power-cutoff state. While the shift lever 48 is placed in the non-drive position, the electric-motor control means 86 places the first electric motor M1 and the second electric motor M2 in the non-load state, for thereby placing the differential portion 11 in the electrically neutral state, so that the engine torque $T_E$ is not transmitted to the drive wheels 38 upon the manual operation of the shift lever 48 from the non-drive position to the drive position, that is, the engine torque $_{TE}$ is not transmitted to the first clutch C1 and/or the second clutch C2 in the process of the engaging action which takes place as a result of the manual operation. Therefore, the first clutch C1 and/or the second clutch 2 is engaged while the engine torque $T_E$ is not transmitted, whereby the durability of the first clutch C1 and/or the second clutch C1 is improved, and/or the shifting shock due to the manual operation of the shift lever 48 is reduced. Further, the fuel economy is improved since the loss of electric energy for controlling the first and second electric motors M1, M2 is reduced while the first and second electric motors M1, M2 are placed in the non-load state under the control of the electric-motor control means 86.

Embodiment 3

Figures 12, 13:
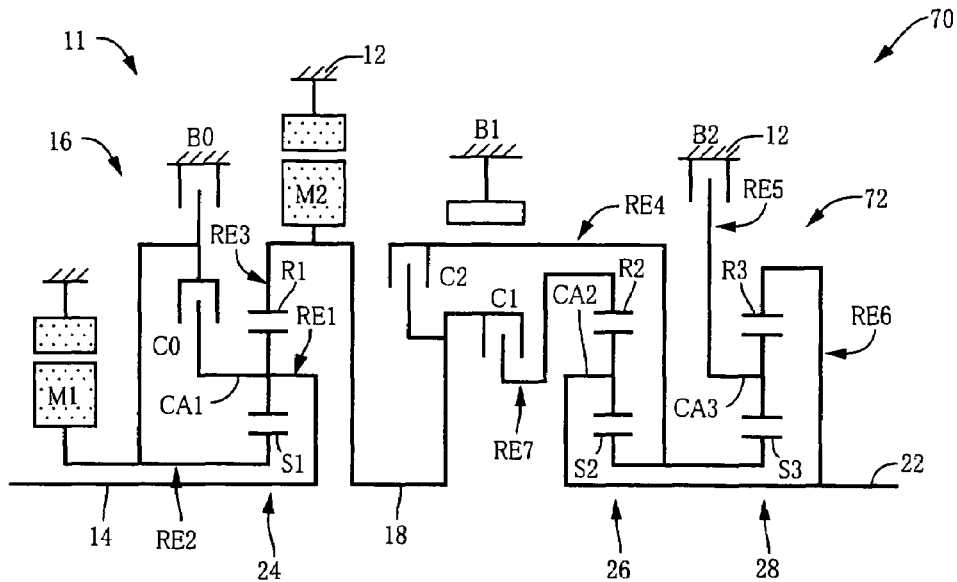
FIG. 12 is a schematic view corresponding to that of FIG. 1, showing an arrangement of a drive system for a hybrid vehicle, which is constructed according to another embodiment of the present invention.
FIG. 13 is a table corresponding to that of FIG. 2, indicating shifting actions of the hybrid vehicle drive system of the embodiment of FIG. 12, which is operable in a selected one of the continuously-variable shifting state and the step-variable shifting state, in relation to different combinations of the operating states of the hydraulically operated frictional coupling devices to effect the respective shifting actions.
Figure 14:
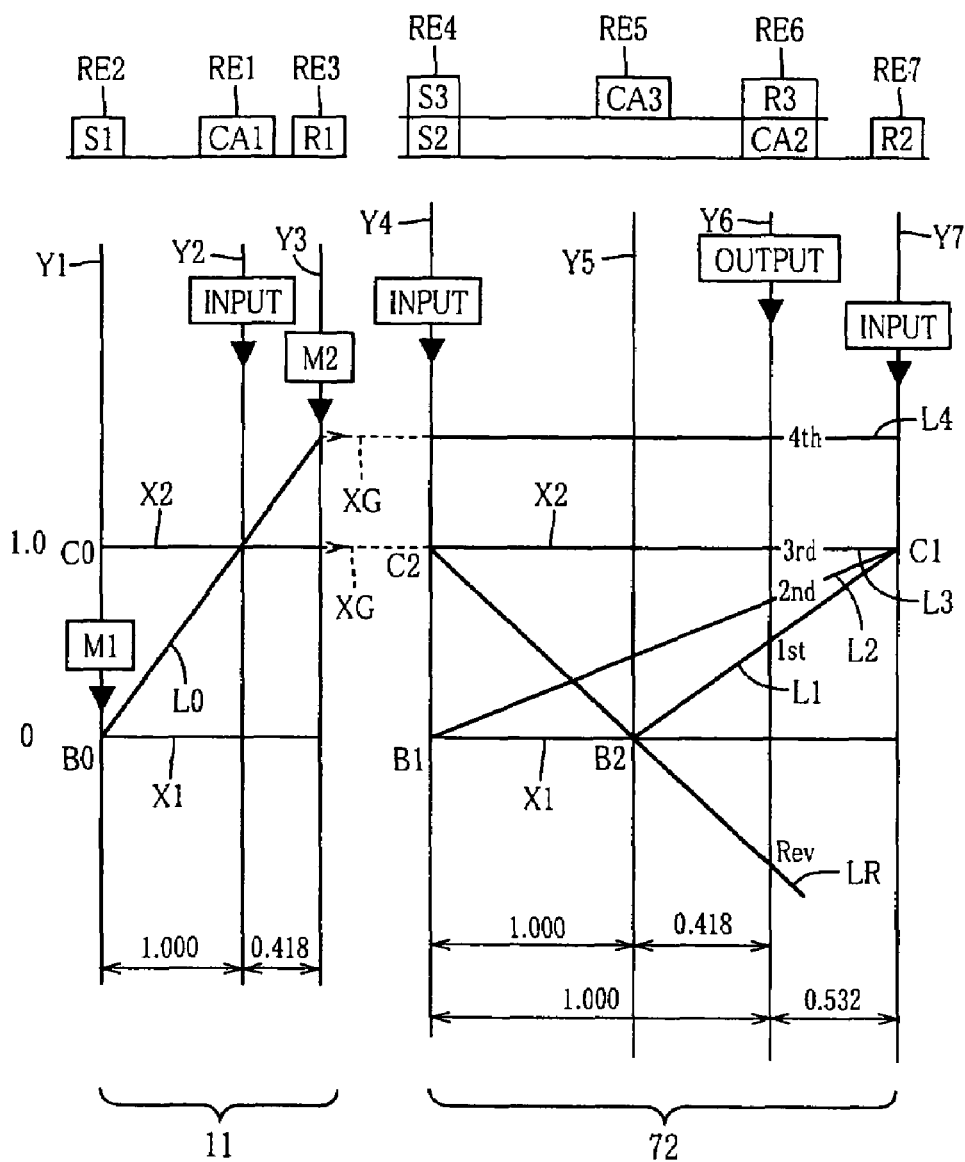
FIG. 14 is a collinear chart corresponding to that of FIG. 3, indicating relative rotating speeds of the rotary elements of the drive system of the hybrid vehicle drive system of the embodiment of FIG. 15 in the different gear positions of the drive system.

FIG. 12 is a schematic view showing an arrangement of a transmission mechanism 70 according to a further embodiment of the present invention, and FIG. 13 is a table indicating gear positions of the transmission mechanism 70, and different combinations of engaged states of the hydraulically operated frictional coupling devices for respectively establishing those gear positions, while FIG. 14 is a collinear chart for explaining a shifting operation of the transmission mechanism 70.

The transmission mechanism 70 includes the differential portion 11 having the first electric motor M1, power distributing mechanism 16 and second electric motor M2, as in the first embodiment. The transmission mechanism 70 further includes an automatic transmission portion 72 having three forward drive positions. The automatic transmission portion 72 is disposed between the differential portion 11 and the output shaft 22 and is connected in series to the differential portion 11 and output shaft 22, through the power transmitting member 18. The power distributing mechanism 16 includes the first planetary gear set 24 of single-pinion type having a gear ratio ρ1 of about 0.418, for example, and the switching clutch C0 and the switching brake B0, as in the preceding embodiments. The automatic transmission portion 72 includes a single-pinion type second planetary gear set 26 having a gear ratio ρ2 of about 0.532, for example, and a single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the transmission casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the transmission casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 13. Those gear positions have respective speed ratios y (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as a continuously variable transmission described above. In the present transmission mechanism 70, therefore, a step-variable transmission is constituted by the automatic transmission portion 20, and the differential portion 11 which is placed in the fixed-speed-ratio shifting state by engagement of the switching clutch C0 or switching brake B0. Further, a continuously variable transmission is constituted by the automatic transmission portion 20, and the differential portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 13. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, so that the differential portion 11 functions as the continuously variable transmission, while the automatic transmission portion 72 connected in series to the differential portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 10 when the automatic transmission portion 72 is placed in one of those gear positions is continuously variable over a predetermined range. Accordingly, the speed ratio of the automatic transmission portion 72 is continuously variable across the adjacent gear positions, whereby the overall speed ratio γT of the transmission mechanism 70 is continuously variable.

The collinear chart of FIG. 14 indicates, by straight lines, a relationship among the rotating speeds of the rotary elements in each of the gear positions of the transmission mechanism 70, which is constituted by the differential portion 11 functioning as the continuously-variable shifting portion or first shifting portion, and the automatic transmission portion 72 functioning as the step-variable shifting portion or second shifting portion. The collinear chart indicates the rotating speeds of the individual elements of the differential portion 11 when the switching clutch C0 and brake B0 are both released, and the rotating speeds of those elements when the switching clutch C0 or brake B0 is engaged, as in the preceding embodiments In FIG. 14, four vertical lines Y4, Y5, Y6 and Y7 corresponding to the automatic transmission portion 72 respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the automatic transmission portion 72, the fourth rotary element RE4 is selectively connected to the power transmitting member 18 through the second clutch C2, and is selectively fixed to the transmission casing 12 through the first brake B1, and the fifth rotary element RE5 is selectively fixed to the transmission casing 12 through the second brake B2. The sixth rotary element RE6 is fixed to the output shaft 22 of the automatic transmission portion 72, and the seventh rotary element RE7 is selectively connected to the power transmitting member 18 through the first clutch C1.

When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 14. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the differential portion 11. When the switching clutch B0 is engaged in place of the switching clutch C0, the sixth rotary element RE6 is rotated at a speed higher than the engine speed $N_E$, with the drive force received from the differential portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 is also constituted by the differential portion 11 functioning as the continuously-variable shifting portion or first shifting portion, and the automatic transmission portion 72 functioning as the step-variable shifting portion or second shifting portion, so that the present transmission mechanism 70 has advantages similar to those of the first embodiment.

Embodiment 4

Figure 15:
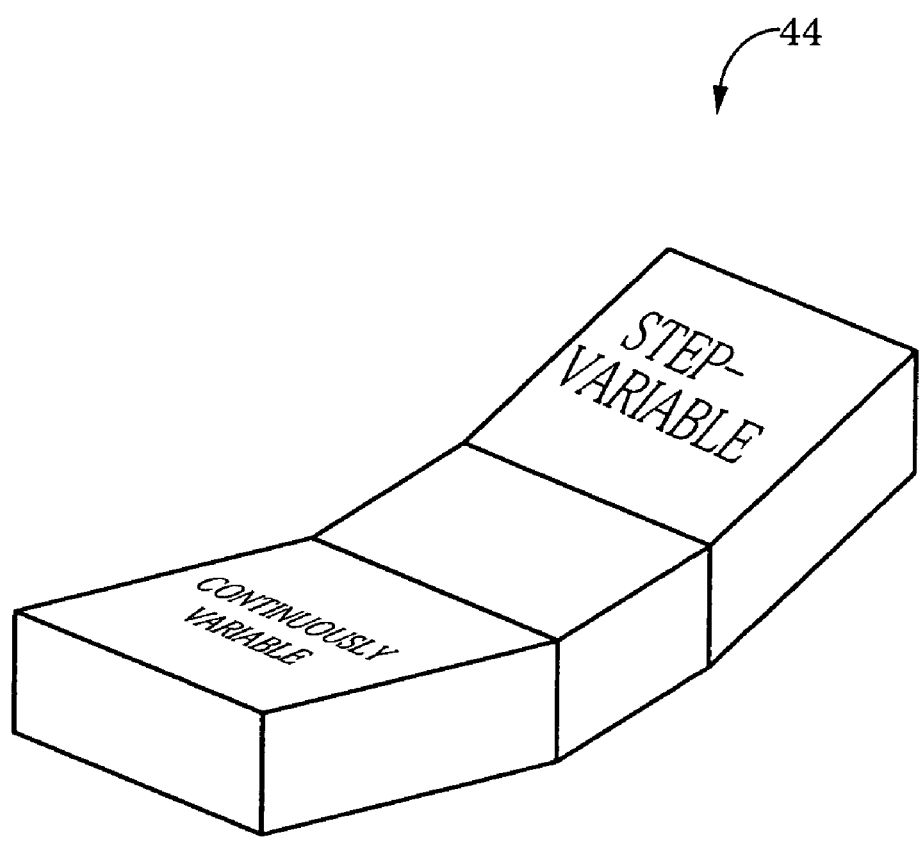
FIG. 15 is a view showing a manually operable shifting-state selecting device in the form of a seesaw switch functioning as a shifting device, the seesaw switch being operated by the user to select the shifting state of the drive system.

FIG. 15 shows an example of a seesaw switch 44 (hereinafter referred to as "switch 44") functioning as a shifting-state selecting device manually operable to select the differential state or the non-differential state (locked state) of the power distributing mechanism 16, that is, to select the continuously-variable shifting state or the step-variable shifting state of the power distributing mechanism 16. The switch 44 is provided on the vehicle such that the switch 44 is manually operable by the user, to select the desired shifting state during running of the vehicle. The switch 44 has a continuously-variable-shifting running pushbutton labeled "CONTINUOUSLY-VARIABLE", and a step-variable-shifting running pushbutton labeled "STEP-VARIABLE", as shown in FIG. 15, and is selectively placed in the continuously-variable shifting position (in which the transmission mechanism 10 is operable as the electrically controlled continuously variable transmission) by depressing the step-variable-shifting running pushbutton, and in the continuously-variable shifting position (in which the transmission mechanism 10 is operable as the step-variable transmission) by depressing the continuously-variable-shifting running pushbutton.

In the preceding embodiments, the shifting state of the transmission mechanism 10 is automatically switched on the basis of the detected vehicle condition and according to the switching boundary line map of FIG. 6. However, the shifting state of the transmission mechanism 10 may be manually switched by a manual operation of the switch 44. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user of the vehicle manually operates the switch 44 to place the transmission mechanism 10 in the continuously-variable shifting state when the user likes the transmission mechanism 10 to operate as the continuously variable transmission or wants to improve the fuel economy of the engine, or alternatively in the step-variable shifting state when the user likes a change of the engine speed as a result of a shifting action of the step-variable transmission.

Where the switch 44 has a neutral position, the switch 44 is placed in its neutral position when the user has not selected the desired shifting state or likes the transmission mechanism 10 to be automatically placed in one of the continuously-variable and step-variable shifting states.

While the embodiments of the present invention have been described above in detail by reference to the accompanying drawings, it is to be understood that the present invention may be otherwise embodied.

The principle of the present invention is applicable to a control device not arranged to implement the step S6 of the flow chart of FIG. 10 (not including the transmitting-member-speed control means 88) for synchronous control of the second electric motor speed $N_{M2}$ by controlling the first electric motor M1 and/or the second electric motor M2, provided step S3 of the flow chart of FIG. 10 is implemented (the engine-speed control means 84 or electric-motor control means 86 is provided) for controlling the engine speed $N_E$ or placing the differential portion 11 in the neutral state, so as to reduce the deterioration of durability of the first clutch C1 and/or the second clutch C2 due to the operation of the shift lever 48 from the non-drive position to the drive position, and/or reduce the shifting shock due to the operation of the shift lever 48.

Where the step S6 is not implemented or before the synchronous control of the second electric motor speed $N_{M2}$ is completed, the hydraulic pressure of the first clutch C1 and/or the second clutch C2 may be gradually increased as in a well known transitional hydraulic pressure control of a clutch in the process of an engaging action of the clutch), rather than the fast application of the hydraulic pressure to the first clutch C1 and/or the second clutch C2 is effected, in the step S7 of the flow chart of FIG. 10 (corresponding to the step-variable shifting control means 54). This gradual increase of the hydraulic pressure of the first clutch C1 and/or the second clutch C2 permits more smooth torque transmission through the clutch C1, C2 in the process of engaging action, and/or a small amount of the shifting shock, than the fast application of the hydraulic pressure to the first clutch C1 and/or the second clutch C2. While the differential portion 11 is placed in the neutral state, however, the fast application of the hydraulic pressure to the first clutch C1 and/or the second clutch C2 does not cause a large amount of the shifting shock.

In the above-described step S3 (corresponding to the engine-speed control means 84), the engine speed $N_E$ is controlled while the shift lever 48 is placed in the neutral position N or parking position P. While the shift lever 48 is placed in the parking position P, however, the engine speed NE need not be controlled so as not to exceed the predetermined value $N_E'$, in view of a possibility that the user of the vehicle likes to race the engine 8 while the vehicle is stationary with the shift lever 48 placed in the parking position P. In other words, it is possible to allow the racing of the engine 8 or it is not necessary to inhibit the racing of the engine 8, while the shift lever 48 is placed in the parking position P.

The control routine illustrated in the flow chart of FIG. 10 is arranged to implement the step not shown (corresponding to the step-variable means 54) to place the power distributing mechanism 16 in the differential state after the affirmative decision is obtained in the step S1 and before the step 2 is implemented. the power distributing mechanism 16 may be placed in the differential state when the step S3 or the step S4 (corresponding to the electric-motor control means 86) is implemented to place the differential portion 11 in the neutral state.

In the illustrated embodiments, the differential portion 11 is placed selectively in its continuously-variable shifting state or in its fixed-speed-ratio shifting state, to place the transmission mechanism 10, 70 selectively in one of the continuously-variable shifting state in which the differential portion 11 functions as the electrically controlled continuously variable transmission, and the step-variable shifting state in which the differential portion 11 functions as the step-variable transmission. However, the principle of the present invention is applicable to a transmission mechanism which cannot be switched to the step-variable shifting state, namely, to a transmission mechanism the differential portion 11 of which is not provided with the switching clutch C0 and switching brake B0 and functions only as the electrically controlled continuously variable transmission (electrically controlled differential device).

In the illustrated embodiments, the transmission mechanism 10, 70 is placed selectively in one of the continuously-variable and step-variable shifting states, when the differential portion 11 (power distributing portion 16) is placed selectively in its differential state in which the differential portion 11 is operable as the electrically controlled continuously variable transmission, and in its non-differential state (locked state) in which the differential portion 11 is not operable as the electrically controlled continuously variable transmission. However, the transmission mechanism 10, 70 may function as the step-variable transmission while the speed ratio of the differential portion 11 is variable in steps rather than continuously, while this transmission portion 11 remains in the differential state. In other words, the differential and non-differential states of the differential portion 11 need not respectively correspond to the continuously-variable and step-variable shifting states of the transmission mechanism 10, 70, and the differential portion 11 need not be switchable between the continuously-variable and step-variable shifting states. The principle of the present invention is applicable to any transmission mechanism (its differential portion 11 or power distributing mechanism 16) which is switchable between the differential state and the non-differential state.

In the transmission mechanisms 10, 70 described above, the power transmitting path is switched between the power-transmitting state and the power-cutoff state, by the frictional coupling devices in the form of the first and second clutches C1, C2 which are disposed between the automatic transmission portion 20, 72 and the differential portion 11. However, these two clutches C1, C2 are not essential and may be replaced by at least one coupling device which is arranged to place the power transmitting path selectively in one of the power-transmitting state and the power-cut-off state, and which may be connected to the output shaft 22 or to the rotary members of the automatic transmission portion 20, 72. The coupling device or devices need not constitute a part of the automatic transmission portion 20, 72, and may be provided separately from the automatic transmission portion 20, 72.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18, respectively, through gears or belts.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

In the illustrated embodiments, the second electric motor M2 is fixed to the power transmitting member 18. However, the second electric motor M2 may be fixed to the output shaft 22 or to a rotary member of the automatic transmission portion 20, 72.

In the illustrated embodiments, the automatic transmission portion 20, 72 is disposed in the power transmitting path between the drive wheels 38, and the power transmitting member 18 which is the output member of the differential portion 11 or power distributing mechanism 16. However, the automatic transmission portion 20, 72 may be replaced by any other type of power transmitting device (transmission) such as: a continuously variable transmission (CVT), which is a kind of an automatic transmission; an automatic transmission which is obtained by modifying a permanent-meshing parallel two-axes type transmission well known as a manual transmission, such that the permanent-meshing parallel two-axes type transmission is provided with select cylinders and shift cylinders for automatic selection of one of its gear positions; and a manual transmission of synchronous meshing type manually operated to select one of its gear positions. Where the continuously variable transmission (CVT) is provided, the transmission mechanism as a whole is placed in the step-variable shifting state when the power distributing mechanism 16 is placed in the fixed-speed-ratio shifting state. The fixed-speed-ratio shifting state is defined as a state in which power is transmitted primarily through a mechanical power transmitting path, without power transmission through an electric path. The continuously variable transmission may be arranged to establish a plurality of predetermined fixed speed ratios corresponding to those of the gear positions of the automatic transmission portion 20, 72, under the control of a step-variable shifting control portion which stores data indicative of the predetermined speed ratios. The principle of the present invention is applicable to a drive system not including the automatic transmission portion 20, 72. Where the drive system uses a continuously variable transmission (CVT) in place of the automatic transmission portion 20, 72 or does not include the automatic transmission portion 20, 73, coupling devices are provided in a power transmitting path between the power transmitting member 18 and the drive wheels 38, so that the power transmitting path is selectively placed in the power-transmitting state and the power-cutoff state by selectively engaging and releasing the coupling devices.

While the automatic transmission portion 20, 72 is connected in series to the differential portion 11 through the power transmitting member 18 in the illustrated embodiments, the automatic transmission portion 20, 72 may be mounted on and disposed coaxially with a counter shaft which is parallel to the input shaft 14. In this case, the differential portion 11 and the automatic transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the illustrated embodiments may be replaced by a differential gear device including a pinion rotated by the engine 8, and a pair of bevel gears which are respectively operatively connected to the first and second electric motors M1, M2.

Although the power distributing mechanism 16 is constituted by one planetary gear set in the illustrated embodiments, the power distributing mechanism 16 may be constituted by two or more planetary gear sets and arranged to be operable as a transmission having three or more gear positions when placed in its non-differential state (fixed-speed-ratio shifting state).

In the illustrated embodiments, the manually operable shifting device 46 is provided with the shift lever 48 manually operable to select one of a plurality of operating positions. However, the shift lever 48 may be replaced by pushbutton switches, a slide-type or any other type of switch manually operable to select a desired one of a plurality of operating positions, or by devices not operated by hand, such as a device operated in response to a voice of the vehicle operator or operated by foot, to select one of a plurality of operating positions. Although the shift lever 48 has the manual forward-drive position M for selecting the number of the forward-drive gear positions available for automatic shifting of the automatic transmission portion 20, 72, the shift lever 48 placed in the manual forward-drive position M may be used to manually shift up or down the automatic transmission portion 20, 72, within the range from the first gear position through the fourth gear position, by operating the shift lever 48 from the position M to the shift-up position "+" or shift-down position "−".

While the switch 44 is of a seesaw type switch in the preceding embodiment, the switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). Where the switch 44 does not have a neutral position, an additional switch may be provided to enable and disable the switch 44. A device not operated by hand but operated in response to a voice of the vehicle operator or operated by foot may be provided in place of, or in addition to the switch 44, to select one of the continuously-variable shifting state (differential state) and the step-variable shifting state (non-differential state).

While the embodiments of the present invention have been described for illustrative purpose only, it is to be understood that the present invention may be embodied with various changes and improvements which may occur to those skilled in the art.

What is claimed is:

1. A control device for a vehicular drive system including (a) a differential portion having a differential mechanism operable to distribute an output of an engine to a first electric motor and a power transmitting member, and a second electric motor disposed in a power transmitting path between the power transmitting member and a drive wheel of a vehicle, (b) a transmission portion which constitutes a part of said power transmitting path and which functions as a transmission, (c) a coupling device operable to place a power transmitting path between said engine and said drive wheels, selectively in one of a power-transmitting state and a power-cutoff state, and (d) a shifting device operable between a drive position for said coupling device to select said power-transmitting state, and a non-drive position for said coupling device to select said power-cutoff state, said control device comprising:

engine-speed control means for controlling a speed of said engine so as not to exceed a predetermined value while said shifting device is placed in said non-drive position.

2. The control device according to claim 1, wherein said engine-speed control means controls an output of the engine, to thereby control the speed of the engine so as not to exceed the predetermined value, and said control device further comprises electric-motor control means for placing said first electric motor and said second electric motor in a non-load state while said shifting device is placed in said non-drive position.

3. The control device according to claim 1, wherein said transmission portion is a step-variable automatic transmission, and said coupling device is provided to shift said step-variable automatic transmission, and wherein said step-variable automatic transmission is placed into a power-cutoff state by said coupling device when said shifting device is operated to said non-drive position.

4. The control device according to claim 1, wherein said differential mechanism includes a differential-state switching device operable to place said differential mechanism selectively in a differential state and a locked state, and wherein said differential mechanism is placed into said differential state by said differential-state switching device when said shifting device is operated to said non-drive position.

5. The control device according to claim 4, wherein said differential mechanism includes a first element fixed to said engine, a second element fixed to said first electric motor, and a third element fixed to said power distributing member, and said differential-state switching device is operable to permit said first, second and third elements to be rotated relative to each other, for thereby placing said differential mechanism in said differential state, and to connect said first, second and third elements for rotation as a unit or to hold said second element stationary, for thereby placing said differential mechanism in said locked state.

6. The control device according to claim 5, wherein said differential-state switching device includes a clutch operable to connect at least two of said first, second and third elements to each other for rotation of said first, second and third elements as a unit, and/or a brake operable to fix said second element to a stationary member for holding said second element stationary.

7. The control device according to claim 6, wherein said differential-state switching device includes both of said clutch and said brake, and is operable to release said clutch and said brake for thereby placing said differential mechanism in said differential state in which said first, second and third elements are rotatable relative to each other and in which said differential mechanism functions as an electrically controlled differential device, and to engage said clutch and release said brake for thereby enabling said differential mechanism to function as a transmission having a speed ratio of 1, or engage said brake and release said clutch for thereby enabling said differential mechanism to function as a speed-increasing transmission having a speed ratio lower than 1.

8. The control device according to claim 5, wherein said differential mechanism is a planetary gear set, and said first, second and third elements are respective a carrier, a sun gear and a ring gear of said planetary gear set.

9. The control device according to claim 8, wherein said planetary gear set is of a single-pinion type.

10. The control device according to claim 8, wherein said vehicular drive system has an overall speed ratio which is determined by a speed ratio of said transmission portion and a speed ratio of said differential portion.

11. A control device for a vehicular drive system including (a) a differential portion having a differential mechanism operable to distribute an output of an engine to a first electric motor and a power transmitting member, and a second electric motor disposed in a power transmitting path between the power transmitting member and a drive wheel of a vehicle, (b) a transmission portion which constitutes a part of said power transmitting path and which functions as a transmission, (c) a coupling device operable to place a power transmitting path between said engine and said drive wheels, selectively in one of a power-transmitting state and a power-cutoff state, and (d) a shifting device operable between a drive position for said coupling device to select said power-transmitting state, and a non-drive position for said coupling device to select said power-cutoff state, said control device comprising:

electric-motor means for placing said first electric motor and said second electric motor in a non-load state while said shifting device is placed in said non-drive position.

12. The control device according to claim 11, wherein said transmission portion is a step-variable automatic transmission, and said coupling device is provided to shift said step-variable automatic transmission, and wherein said step-variable automatic transmission is placed into a power-cutoff state by said coupling device when said shifting device is operated to said non-drive position.

13. The control device according to claim 11, wherein said differential mechanism includes a differential-state switching device operable to place said differential mechanism selectively in a differential state and a locked state, and wherein said differential mechanism is placed into said differential state by said differential-state switching device when said shifting device is operated to said non-drive position.

14. The control device according to claim 13, wherein said differential mechanism includes a first element fixed to said engine, a second element fixed to said first electric motor, and a third element fixed to said power distributing member, and said differential-state switching device is operable to permit said first, second and third elements to be rotated relative to each other, for thereby placing said differential mechanism in said differential state, and to connect said first, second and third elements for rotation as a unit or to hold said second element stationary, for thereby placing said differential mechanism in said locked state.

15. The control device according to claim 14, wherein said differential-state switching device includes a clutch operable to connect at least two of said first, second and third elements to each other for rotation of said first, second and third elements as a unit, and/or a brake operable to fix said second element to a stationary member for holding said second element stationary.

16. The control device according to claim 15, wherein said differential-state switching device includes both of said clutch and said brake, and is operable to release said clutch and said brake for thereby placing said differential mechanism in said differential state in which said first, second and third elements are rotatable relative to each other and in which said differential mechanism functions as an electrically controlled differential device, and to engage said clutch and release said brake for thereby enabling said differential mechanism to function as a transmission having a speed ratio of 1, or engage said brake and release said clutch for thereby enabling said differential mechanism to function as a speed-increasing transmission having a speed ratio lower than 1.

17. The control device according to claim 14, wherein said differential mechanism is a planetary gear set, and said first, second and third elements are respective a carrier, a sun gear and a ring gear of said planetary gear set.

18. The control device according to claim 17, wherein said planetary gear set is of a single-pinion type.

19. The control device according to claim 11, wherein said vehicular drive system has an overall speed ratio which is determined by a speed ratio of said transmission portion and a speed ratio of said differential portion.

20. A control device for a vehicular drive system including (a) a differential portion having a differential mechanism operable to distribute an output of an engine to a first electric motor and a power transmitting member, and a second electric motor which can transmit power a drive wheel of a vehicle, (b) a coupling device operable to place a power transmitting path between said engine and said drive wheels, selectively in one of a power-transmitting state and a power-cutoff state, and (c) a shifting device operable between a drive position for said coupling device to select said power-transmitting state, and a non-drive position for said coupling device to select said power-cutoff state, said control device comprising:

engine-speed control means for controlling a speed of said engine so as not to exceed a predetermined value while said shifting device is placed in said non-drive position.

* * * * *